US012713419B2

(12) United States Patent
Chai et al.

(10) Patent No.: US 12,713,419 B2
(45) Date of Patent: Aug. 18, 2026

(54) METHOD FOR DETERMINING COVERAGE ENHANCEMENT LEVEL AND APPARATUS

(71) Applicant: HUAWEI TECHNOLOGIES CO., LTD., Shenzhen (CN)

(72) Inventors: Xiaomeng Chai, Shanghai (CN); Xiuqiang Xu, Shanghai (CN); Yiqun Wu, Shanghai (CN); Yan Chen, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 756 days.

(21) Appl. No.: 18/066,472

(22) Filed: Dec. 15, 2022

(65) Prior Publication Data

US 2023/0164848 A1 May 25, 2023

Related U.S. Application Data

(63) Continuation of application No. PCT/CN2021/100883, filed on Jun. 18, 2021.

(30) Foreign Application Priority Data

Jun. 18, 2020 (CN) ........................ 202010559748.0

(51) Int. Cl.
*H04W 72/115* (2023.01)
*H04W 24/10* (2009.01)
(Continued)

(52) U.S. Cl.
CPC .......... *H04W 72/115* (2023.01); *H04W 24/10* (2013.01); *H04W 74/0833* (2013.01); *H04W 74/0836* (2024.01)

(58) Field of Classification Search
CPC ............... H04W 24/10; H04W 72/115; H04W 74/0833; H04W 74/0836; H04W 8/22; H04W 88/02; H04W 24/08; H04W 16/18
See application file for complete search history.

(56) References Cited

U.S. PATENT DOCUMENTS

2016/0262109 A1* 9/2016 Chen ........................ H04W 4/70
2016/0316490 A1* 10/2016 Wang ................ H04W 74/0833
(Continued)

FOREIGN PATENT DOCUMENTS

CN 106559188 A 4/2017
CN 109803302 A 5/2019
(Continued)

OTHER PUBLICATIONS

3GPP TS 36.321 V16.0.0 (Mar. 2020), 3rd Generation Partnership Project; Technical Specification Group Radio Access Network; Evolved Universal Terrestrial Radio Access (E-UTRA); Medium Access Control (MAC) protocol specification (Release 16),total:141 pages.

(Continued)

*Primary Examiner* — Liem H. Nguyen
(74) *Attorney, Agent, or Firm* — HAUPTMAN HAM, LLP

(57) ABSTRACT

This application discloses a method. The method includes: A terminal device obtains one or more measurement results respectively corresponding to one or more reference signals, and determines a CEL of the terminal device based on the one or more measurement results and at least one of N thresholds, where the N thresholds are a threshold 0, a threshold 1, . . . , and a threshold (N−1) in descending order. If there is a measurement result greater than or equal to the threshold 0 in the one or more measurement results, the CEL of the terminal device is a CEL 0. If the one or more measurement results are less than a threshold i, and there is a measurement result greater than or equal to a threshold (i+1), the CEL of the terminal device is a CEL (i+1), and a value of i is an integer from 0 to (N−2).

18 Claims, 5 Drawing Sheets

(51) Int. Cl.
*H04W 74/0833* (2024.01)
*H04W 74/0836* (2024.01)

(56) References Cited

U.S. PATENT DOCUMENTS

| | | | | |
|---|---|---|---|---|
| 2017/0041960 | A1* | 2/2017 | Quan | H04W 74/0833 |
| 2017/0318478 | A1* | 11/2017 | Basu Mallick | H04W 48/12 |
| 2018/0049087 | A1* | 2/2018 | Lee | H04W 36/302 |
| 2018/0063722 | A1* | 3/2018 | Lee | H04L 1/08 |
| 2018/0249510 | A1* | 8/2018 | Lee | H04W 4/06 |
| 2019/0380045 | A1* | 12/2019 | Sha | H04W 68/005 |
| 2020/0128589 | A1* | 4/2020 | Wu | H04W 52/36 |
| 2021/0195646 | A1* | 6/2021 | Gao | H04B 17/327 |
| 2022/0210681 | A1* | 6/2022 | Thangarasa | H04W 56/001 |
| 2023/0020868 | A1* | 1/2023 | Su | H04W 52/146 |

FOREIGN PATENT DOCUMENTS

| | | | |
|---|---|---|---|
| CN | 110234151 | A | 9/2019 |
| EP | 3637825 | A1 | 4/2020 |
| WO | 2019214718 | A1 | 11/2019 |

OTHER PUBLICATIONS

3GPP TS 36.331 V16.8.0:“3rd Generation Partnership Project; Technical Specification Group Radio Access Network; Evolved Universal Terrestrial Radio Access (E-UTRA); Radio Resource Control (RRC); Protocol specification(Release 16)”, Mar. 2022, total 1092 pages.

3GPP TS 38.321 V16.0.0 (Mar. 2020), 3rd Generation Partnership Project; Technical Specification Group Radio Access Network; NR; Medium Access Control (MAC) protocol specification (Release 16), 141 pages.

3GPP TS 38.331 V16.0.0 (Mar. 2020), 3rd Generation Partnership Project; Technical Specification Group Radio Access Network; NR; Radio Resource Control (RRC) protocol specification (Release 16), 835 pages.

International Search Report issued in corresponding International Application No. PCT/CN2021/100883, dated Sep. 18, 2021, pp. 1-4.

Extended European Search Report issued in corresponding European Application No. 21824820.1, dated Oct. 17, 2023, pp. 1-6.

European Office Action issued in EP21 824 820.1 dated Nov. 21, 2025.

* cited by examiner

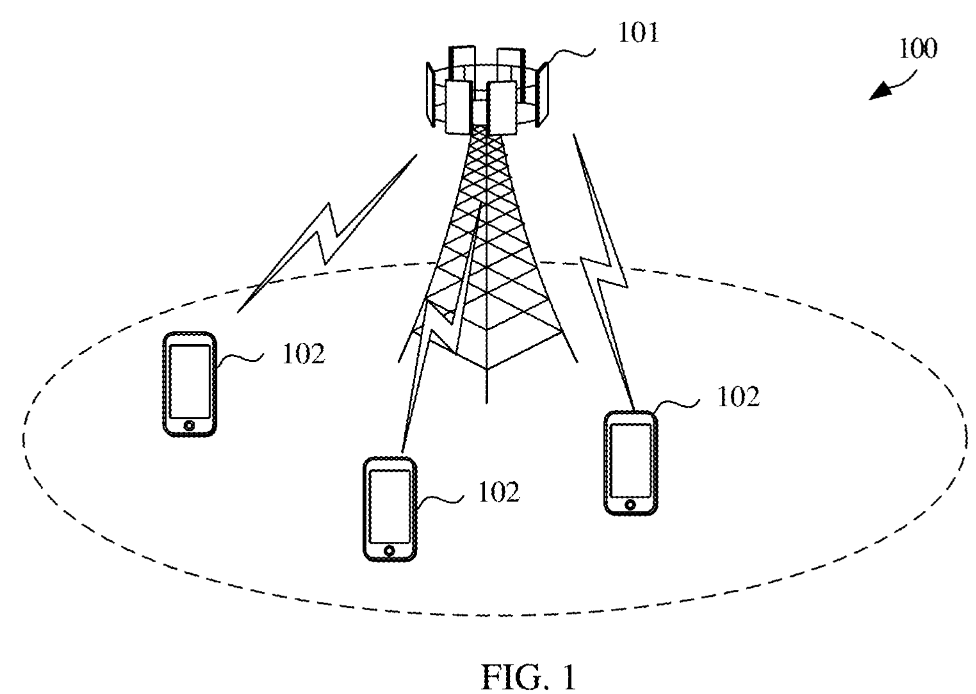

FIG. 1

A terminal device obtains one or more measurement results respectively corresponding to one or more reference signals — 201

↓

The terminal device determines a CEL of the terminal device based on the one or more measurement results and at least one of N thresholds; and if there is a measurement result greater than or equal to a threshold 0 in the one or more measurement results, the CEL of the terminal device is a CEL 0; or if the one or more measurement results are less than a threshold i, and there is a measurement result greater than or equal to a threshold (i+1), the CEL of the terminal device is a CEL (i+1), where a value of i is an integer from 0 to (N−2) — 202

FIG. 2

METHOD FOR DETERMINING COVERAGE ENHANCEMENT LEVEL AND APPARATUS

CROSS-REFERENCE TO RELATED APPLICATIONS

This application is a continuation of International Application No. PCT/CN2021/100883, filed on Jun. 18, 2021, which claims priority to Chinese Patent Application No. 202010559748.0, filed on Jun. 18, 2020. The disclosures of the aforementioned applications are hereby incorporated by reference in their entireties.

TECHNICAL FIELD

Embodiments of this application relate to the field of communication technologies, and in particular, to a method for determining a coverage enhancement level and an apparatus.

BACKGROUND

For deployment environments of some terminal devices, signal coverage strength may not meet signal reception requirements of the terminal devices. Based on this, a coverage enhancement (coverage enhancement, CE) technology is provided. The CE may also be referred to as enhanced coverage (enhanced coverage, EC). A main method for implementing the CE is to send uplink signals or downlink signals for a plurality of times, to improve a data reception success rate through a plurality of times of reception and combination.

How a terminal device determines a coverage enhancement level of the terminal device is a problem that needs to be resolved.

SUMMARY

Embodiments of this application provide a method for determining a coverage enhancement level and an apparatus, to resolve a problem that how a terminal device determines a coverage enhancement level of the terminal device.

According to a first aspect, a method for determining a coverage enhancement level is provided. The method may be implemented by using the following steps. A terminal device obtains one or more measurement results respectively corresponding to one or more reference signals; and the terminal device determines a coverage enhancement level CEL of the terminal device based on the one or more measurement results and at least one of N thresholds. N is a positive integer. The terminal device sequentially determines, in descending order of the thresholds, whether there is a measurement result greater than or equal to a threshold, to determine the CEL of the terminal device. In this method, regardless of whether the terminal device receives one or more reference signals, the CEL of the terminal device can be obtained by comparing a measurement result of a measurement signal with a specified threshold. This method can be widely applied to more communication scenarios. When the terminal device obtains a plurality of measurement results of a plurality of reference signals, if each measurement result is separately compared with the N thresholds, a plurality of CELs may be obtained. According to the method provided in this embodiment of this application, the lowest value in the plurality of CELs is finally determined by the terminal device as the CEL. In other words, equivalently, the terminal device may determine the CEL of the terminal device based on a reference signal with the highest measurement result. A lower value of the CEL corresponds to a higher threshold, and a better measurement result. When the CEL corresponds to a repetition number, the CEL determined by the terminal device can correspond to a smaller repetition number, to avoid excessive repetitions. In this way, resource utilization can be improved, and interference to another terminal device can be reduced.

The measurement result may include a parameter that can reflect signal quality, such as received power or a signal-to-noise ratio of a reference signal. For example, the measurement result may be RSRP.

Optionally, N is a positive integer, and the N thresholds are a threshold 0, a threshold 1, . . . , and a threshold (N−1) in descending order; and if there is a measurement result greater than or equal to the threshold 0 in the one or more measurement results, the CEL of the terminal device is a CEL 0; or if the one or more measurement results are all less than a threshold i, and there is a measurement result greater than or equal to a threshold (i+1) in the one or more measurement results, the CEL of the terminal device is a CEL (i+1), and a value of i is an integer from 0 to (N−2).

In a possible design, if the one or more measurement results are all less than the threshold (N−1), the CEL of the terminal device is a CEL N. Alternatively, if the one or more measurement results are all less than the threshold (N−1), it indicates that a channel condition is poor, and the terminal device should skip performing random access or skip performing grant-free transmission this time.

In a possible design, the terminal device selects a reference signal corresponding to a measurement result that is greater than or equal to a minimum threshold corresponding to the CEL of the terminal device. In this case, the terminal device does not need to select a reference signal based on a reference signal received power threshold in a conventional manner, but selects a reference signal based on a threshold corresponding to a CEL. In this way, not only a CEL can be determined when a plurality of references are received, but also a reference signal can be selected, and a beam corresponding to the reference signal is further notified to a network device, to obtain a better beam gain in subsequent communication. The selected reference signal is associated with the determined CEL, so that a reference signal selected by the terminal in each random access attempt or grant-free transmission attempt matches the determined CEL.

Optionally, if the one or more measurement results obtained by the terminal device are all less than the threshold (N−1), the terminal device selects a reference signal corresponding to any one of the one or more measurement results, or the terminal device selects a reference signal corresponding to the largest measurement result in the one or more measurement results, or the terminal device skips performing random access or skips performing grant-free transmission this time.

In a possible design, the N thresholds are a threshold 0, a threshold 1, . . . , and a threshold (N−1) in descending order; and if there is a measurement result greater than the threshold 0 in the one or more measurement results, the CEL of the terminal device is a CEL 0; or if the one or more measurement results are all less than or equal to a threshold i, and there is a measurement result greater than a threshold (i+1) in the one or more measurement results, the CEL of the terminal device is a CEL (i+1), and a value of i is an integer from 0 to (N−2).

In a possible design, if the one or more measurement results are all less than or equal to the threshold (N−1), the CEL of the terminal device is a CEL N. Alternatively, if the one or more measurement results are all less than or equal to the threshold (N−1), it indicates that a channel condition is poor, and the terminal device should skip performing random access or skip performing grant-free transmission this time.

In a possible design, the terminal device selects a reference signal corresponding to a measurement result that is greater than a minimum threshold corresponding to the CEL of the terminal device.

Optionally, if the one or more measurement results obtained by the terminal device are all less than or equal to the threshold (N−1), the terminal device selects a reference signal corresponding to any one of the one or more measurement results, or the terminal device selects a reference signal corresponding to the largest measurement result in the one or more measurement results, or the terminal device skips performing random access or skips performing grant-free transmission this time.

In a possible design, after determining the CEL of the terminal device, the terminal device updates the CEL of the terminal device in a process of a $K^{th}$ random access attempt or a $K^{th}$ grant-free transmission attempt, where K is a positive integer, and the updated CEL may be different from the previously determined CEL. The terminal device determines a power ramp amount based on a power ramp step corresponding to the updated CEL and/or a power ramp counter corresponding to the updated CEL, where the determined power ramp amount is used for the $K^{th}$ random access attempt or the $K^{th}$ grant-free transmission attempt.

Optionally, the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) are corresponding to a same power ramp step, and the CEL 0 to the CEL (N−1) are corresponding to a same power ramp counter.

In a possible design, the terminal device communicates with a network device based on a parameter corresponding to the CEL of the terminal device, where the CEL of the terminal device corresponds to any one or more of the following parameters of a physical channel: a time domain resource, a frequency domain resource, a code domain resource, or a repetition number; and the physical channel includes any one or more of the following parameters: a physical random access channel PRACH in a two-step random access procedure, a physical uplink shared channel PUSCH in a two-step random access procedure, a physical downlink control channel PDCCH in a two-step random access procedure, a physical downlink shared channel PDSCH in a two-step random access procedure, a PRACH in a four-step random access procedure, a PDCCH in a four-step random access procedure, a PDSCH in a four-step random access procedure, a PUSCH in a four-step random access procedure, a PUSCH in a grant-free transmission process, a PDCCH in a grant-free transmission process, or a PDSCH in a grant-free transmission process.

According to a second aspect, a method for determining a coverage enhancement level is provided. The method may be implemented by using the following steps. A terminal device obtains one or more measurement results respectively corresponding to one or more reference signals. The terminal device selects a first reference signal from the one or more reference signals, where a measurement result of the first reference signal is greater than or equal to a reference signal received power threshold; and the terminal device determines a CEL of the terminal device based on the measurement result of the first reference signal and a coverage enhancement level CEL threshold. The first reference signal is selected from the received one or more reference signals, and then the CEL of the terminal device is determined based on the first reference signal and the CEL threshold. Regardless of whether the terminal device receives one or more reference signals, the CEL of the terminal device can be determined, and this method can be widely applied to more communication scenarios. When the terminal device obtains a plurality of measurement results of a plurality of reference signals, if each measurement result is separately compared with the N thresholds, a plurality of CELs may be obtained. According to the method provided in this embodiment of this application, the plurality of CELs are classified into two priorities: a high priority and a low priority based on the reference signal received power threshold. A high-priority CEL is a CEL whose maximum threshold corresponding to the CEL is greater than the reference signal received power threshold. The terminal device preferentially selects the high-priority CEL. Within a same priority, UE may comprehensively consider factors such as a latency and RSRP to determine a coverage level to be selected. A lower value of the CEL corresponds to a higher threshold, and a better measurement result. When the CEL corresponds to a repetition number, the CEL determined by the terminal device can correspond to a smaller repetition number, to avoid excessive repetitions. In this way, resource utilization can be improved, and interference to another terminal device can be reduced.

The measurement result may include a parameter that can reflect signal quality, such as received power or a signal-to-noise ratio of a reference signal. For example, the measurement result may be the RSRP.

According to the method provided in this embodiment of this application, the first reference signal is selected based on the reference signal received power threshold, and the CEL determined based on the measurement result of the first reference signal and the CEL threshold may not be a maximum CEL that can be determined based on the measurement results of the one or more reference signals. For example, measurement results of the first reference signal and a second reference signal are greater than the reference signal received power threshold, the measurement result of the second reference signal is greater than the measurement result of the first reference signal, and a CEL that can be determined by the terminal device based on the measurement result of the second reference signal and the CEL threshold is greater than a CEL that can be determined by the terminal device based on the measurement result of the first reference signal and the CEL threshold. However, according to the method provided in this embodiment of this application, the terminal device can have higher selection freedom. In addition, if a resource of the first reference signal is before a resource of the second reference signal, the terminal device selects the first reference signal, so that a latency can be reduced.

In a possible design, the terminal device selects the second reference signal in a process of a $K^{th}$ random access attempt or a $K^{th}$ grant-free transmission attempt, and updates the CEL of the terminal device based on the measurement result of the second reference signal and the CEL threshold, where K is a positive integer. The selected reference signal is associated with the determined CEL, so that a reference signal selected by the terminal in each random access attempt or grant-free transmission attempt matches the determined CEL.

In a possible design, the CEL threshold includes N thresholds, N is a positive integer, and the N thresholds are a threshold 0, a threshold 1, . . . , and a threshold (N−1) in descending order; and if the measurement result of the first reference signal is greater than or equal to the threshold 0, the CEL of the terminal device is a CEL 0; or if the measurement result of the first reference signal is less than a threshold i and greater than or equal to a threshold (i+1), the CEL of the terminal device is a CEL (i+1), and a value of i is an integer from 0 to (N−2).

In a possible design, if the measurement result of the first reference signal is less than the threshold (N−1), the CEL of the terminal device is a CEL N.

In a possible design, the terminal device updates the CEL of the terminal device in the process of the $K^{th}$ random access attempt or the $K^{th}$ grant-free transmission attempt, where K is a positive integer. The terminal device determines a power ramp amount based on a power ramp step corresponding to the updated CEL and/or a power ramp counter corresponding to the updated CEL, where the determined power ramp amount is used for the $K^{th}$ random access attempt or the $K^{th}$ grant-free transmission attempt.

Optionally, the CEL 0 to a CEL (N−1) are respectively in a one-to-one correspondence with N power ramp steps, and the CEL 0 to the CEL (N−1) are respectively in a one-to-one correspondence with N power ramp counters; the CEL 0 to a CEL (N−1) are corresponding to a same power ramp step, and/or the CEL 0 to the CEL (N−1) are corresponding to a same power ramp counter.

In a possible design, the terminal device communicates with a network device based on a parameter corresponding to the CEL of the terminal device, where the CEL of the terminal device corresponds to any one or more of the following parameters of a physical channel: a time domain resource, a frequency domain resource, a code domain resource, or a repetition number; and the physical channel includes any one or more of the following parameters: a physical random access channel PRACH in a two-step random access procedure, a physical uplink shared channel PUSCH in a two-step random access procedure, a physical downlink control channel PDCCH in a two-step random access procedure, a physical downlink shared channel PDSCH in a two-step random access procedure, a PRACH in a four-step random access procedure, a PDCCH in a four-step random access procedure, a PDSCH in a four-step random access procedure, a PUSCH in a four-step random access procedure, a PUSCH in a grant-free transmission process, a PDCCH in a grant-free transmission process, or a PDSCH in a grant-free transmission process.

In a possible design, if the one or more measurement results are all less than the reference signal received power threshold, the terminal device selects a third reference signal less than the reference signal received power threshold, and determines the CEL of the terminal device based on a measurement result of the third reference signal and the CEL threshold. Alternatively, if the one or more measurement results are all less than the threshold (N−1), it indicates that a channel condition is poor, and the terminal device should skip performing random access or skip performing grant-free transmission this time.

In a possible design, if there are a plurality of measurement results less than the reference signal received power threshold, the measurement result of the third reference signal is the largest value of the plurality of measurement results less than the reference signal received power threshold.

In a possible design, the first reference signal may alternatively be any one of the one or more reference signals obtained in S601. In this manner, maximum freedom may be given to the terminal device, and the terminal device may determine the CEL to be selected by comprehensively considering factors such as a latency and RSRP.

In a possible design, the CEL threshold includes N thresholds, N is a positive integer, and the N thresholds are a threshold 0, a threshold 1, . . . , and a threshold (N−1) in descending order; and if the measurement result of the first reference signal is greater than the threshold 0, the CEL of the terminal device is a CEL 0; or if the measurement result of the first reference signal is less than or equal to a threshold i and greater than a threshold (i+1), the CEL of the terminal device is a CEL (i+1), and a value of i is an integer from 0 to (N−2).

In a possible design, if the measurement result of the first reference signal is less than or equal to the threshold (N−1), the CEL of the terminal device is a CEL N.

In a possible design, if the one or more measurement results are all less than or equal to the reference signal received power threshold, the terminal device selects a third reference signal less than or equal to the reference signal received power threshold, and determines the CEL of the terminal device based on a measurement result of the third reference signal and the CEL threshold. Alternatively, if the one or more measurement results are all less than or equal to the threshold (N−1), it indicates that a channel condition is poor, and the terminal device should skip performing random access or skip performing grant-free transmission this time.

In a possible design, if there are a plurality of measurement results less than or equal to the reference signal received power threshold, the measurement result of the third reference signal is the largest value of the plurality of measurement results less than or equal to the reference signal received power threshold.

According to a third aspect, an apparatus is provided. The apparatus may be a terminal device, an apparatus (for example, a chip, a chip system, or a circuit) in the terminal device, or an apparatus that can be used in cooperation with the terminal device. In a design, the apparatus may include modules that are in one-to-one correspondence with the method/operations/steps/actions described in the first aspect. The modules may be implemented by using a hardware circuit, software, or a combination of a hardware circuit and software. In a design, the apparatus may include an obtaining module and a processing module.

For example, the obtaining module is configured to obtain one or more measurement results respectively corresponding to one or more reference signals, and the processing module is configured to determine a coverage enhancement level CEL of the terminal device based on the one or more measurement results and at least one of N thresholds, where N is a positive integer, and the N thresholds are a threshold 0, a threshold 1, . . . , and a threshold (N−1) in descending order. If there is a measurement result greater than or equal to the threshold 0 in the one or more measurement results, the CEL of the terminal device is a CEL 0. If the one or more measurement results are less than a threshold i, and there is a measurement result greater than or equal to a threshold (i+1) in the measurement result of the first reference signal, the CEL of the terminal device is a CEL (i+1), and a value of i is an integer from 0 to (N−2).

The measurement result may include a parameter that can reflect signal quality, such as received power or a signal-to-noise ratio of a reference signal. For example, the measurement result may be RSRP.

In a possible design, if the one or more measurement results are all less than the threshold (N−1), the CEL of the terminal device is a CEL N.

In a possible design, the processing module is further configured to select a reference signal corresponding to a measurement result that is greater than or equal to a minimum threshold corresponding to the CEL of the terminal device.

Optionally, the processing module is further configured to: if the obtained one or more measurement results are all less than the threshold (N−1), select a reference signal corresponding to any one of the one or more measurement results, or select a reference signal corresponding to the largest measurement result in the one or more measurement results, or skip performing random access or skip performing grant-free transmission this time.

In a possible design, the N thresholds are a threshold 0, a threshold 1, . . . , and a threshold (N−1) in descending order; and if there is a measurement result greater than the threshold 0 in the one or more measurement results, the CEL of the terminal device is a CEL 0; or if the one or more measurement results are all less than or equal to a threshold i, and there is a measurement result greater than a threshold (i+1) in the one or more measurement results, the CEL of the terminal device is a CEL (i+1), and a value of i is an integer from 0 to (N−2).

In a possible design, if the one or more measurement results are all less than or equal to the threshold (N−1), the CEL of the terminal device is a CEL N. Alternatively, if the one or more measurement results are all less than or equal to the threshold (N−1), it indicates that a channel condition is poor, and the terminal device should skip performing random access or skip performing grant-free transmission this time.

In a possible design, the processing module is further configured to select a reference signal corresponding to a measurement result that is greater than a minimum threshold corresponding to the CEL of the terminal device.

Optionally, the processing module is further configured to: if the obtained one or more measurement results are all less than or equal to the threshold (N−1), select a reference signal corresponding to any one of the one or more measurement results, or select a reference signal corresponding to the largest measurement result in the one or more measurement results, or skip performing random access or skip performing grant-free transmission this time.

In a possible design, the processing module is further configured to: update the CEL of the terminal device in a process of a $K^{th}$ random access attempt or a $K^{th}$ grant-free transmission attempt, where K is a positive integer; and determine a power ramp amount based on a power ramp step corresponding to the updated CEL and/or a power ramp counter corresponding to the updated CEL, where the determined power ramp amount is used for the $K^{th}$ random access attempt or the $K^{th}$ grant-free transmission attempt.

Optionally, the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) are corresponding to a same power ramp step, and the CEL 0 to the CEL (N−1) are corresponding to a same power ramp counter.

In a possible design, the apparatus further includes a communication module, where the communication module is configured to communicate with a network device based on a parameter corresponding to the CEL of the terminal device, where the CEL of the terminal device corresponds to any one or more of the following parameters of a physical channel: a time domain resource, a frequency domain resource, a code domain resource, or a repetition number; and the physical channel includes any one or more of the following parameters: a physical random access channel PRACH in a two-step random access procedure, a physical uplink shared channel PUSCH in a two-step random access procedure, a physical downlink control channel PDCCH in a two-step random access procedure, a physical downlink shared channel PDSCH in a two-step random access procedure, a PRACH in a four-step random access procedure, a PDCCH in a four-step random access procedure, a PDSCH in a four-step random access procedure, a PUSCH in a four-step random access procedure, a PUSCH in a grant-free transmission process, a PDCCH in a grant-free transmission process, or a PDSCH in a grant-free transmission process.

For beneficial effects of the third aspect and the possible designs, refer to corresponding descriptions of the first aspect. Details are not described again.

According to a fourth aspect, an apparatus is provided. The apparatus may be a terminal device, may be an apparatus (for example, a chip, a chip system, or a circuit) in the terminal device, or may be an apparatus that can be used with the terminal device. In a design, the apparatus may include modules that are in one-to-one correspondence with the method/operations/steps/actions described in the first aspect. The modules may be implemented by using a hardware circuit, software, or a combination of a hardware circuit and software. In a design, the apparatus may include an obtaining module and a processing module.

For example, the obtaining module is configured to obtain one or more measurement results respectively corresponding to one or more reference signals. The processing module is configured to select a first reference signal from the one or more reference signals, where a measurement result of the first reference signal is greater than or equal to a reference signal received power threshold; and determine a CEL of the terminal device based on the measurement result of the first reference signal and a coverage enhancement level CEL threshold.

The measurement result may include a parameter that can reflect signal quality, such as received power or a signal-to-noise ratio of a reference signal. For example, the measurement result may be RSRP.

In a possible design, the processing module is further configured to: select a second reference signal in a process of a $K^{th}$ random access attempt or a $K^{th}$ grant-free transmission attempt, and update the CEL of the terminal device based on a measurement result of the second reference signal and the CEL threshold, where K is a positive integer.

In a possible design, the CEL threshold includes N thresholds, N is a positive integer, and the N thresholds are a threshold 0, a threshold 1, . . . , and a threshold (N−1) in descending order; and if the measurement result of the first reference signal is greater than or equal to the threshold 0, the CEL of the terminal device is a CEL 0; or if the measurement result of the first reference signal is less than a threshold i and greater than or equal to a threshold (i+1), the CEL of the terminal device is a CEL (i+1), and a value of i is an integer from 0 to (N−2).

In a possible design, if the measurement result of the first reference signal is less than the threshold (N−1), the CEL of the terminal device is a CEL N.

In a possible design, the processing module is further configured to: update the CEL of the terminal device in the process of the $K^{th}$ random access attempt or the $K^{th}$ grant-free transmission attempt, where K is a positive integer; and determine a power ramp amount based on a power ramp step corresponding to the updated CEL and/or a power ramp counter corresponding to the updated CEL, where the determined power ramp amount is used for the $K^{th}$ random access attempt or the $K^{th}$ grant-free transmission attempt.

Optionally, the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) are corresponding to a same power ramp step, and/or the CEL 0 to the CEL (N−1) are corresponding to a same power ramp counter.

In a possible design, the apparatus further includes a communication module, where the communication module is configured to communicate with a network device based on a parameter corresponding to the CEL of the terminal device, where the CEL of the terminal device corresponds to any one or more of the following parameters of a physical channel: a time domain resource, a frequency domain resource, a code domain resource, or a repetition number; and the physical channel includes any one or more of the following parameters: a physical random access channel PRACH in a two-step random access procedure, a physical uplink shared channel PUSCH in a two-step random access procedure, a physical downlink control channel PDCCH in a two-step random access procedure, a physical downlink shared channel PDSCH in a two-step random access procedure, a PRACH in a four-step random access procedure, a PDCCH in a four-step random access procedure, a PDSCH in a four-step random access procedure, a PUSCH in a four-step random access procedure, a PUSCH in a grant-free transmission process, a PDCCH in a grant-free transmission process, or a PDSCH in a grant-free transmission process.

In a possible design, the processing module is further configured to: if the one or more measurement results are all less than the reference signal received power threshold, select a third reference signal less than the reference signal received power threshold, and determine the CEL of the terminal device based on a measurement result of the third reference signal and the CEL threshold.

In a possible design, if there are a plurality of measurement results less than the reference signal received power threshold, the measurement result of the third reference signal is the largest value of the plurality of measurement results less than the reference signal received power threshold.

In a possible design, the CEL threshold includes N thresholds, N is a positive integer, and the N thresholds are a threshold 0, a threshold 1, . . . , and a threshold (N−1) in descending order; and if the measurement result of the first reference signal is greater than the threshold 0, the CEL of the terminal device is a CEL 0; or if the measurement result of the first reference signal is less than or equal to a threshold i and greater than a threshold (i+1), the CEL of the terminal device is a CEL (i+1), and a value of i is an integer from 0 to (N−2).

In a possible design, if the measurement result of the first reference signal is less than or equal to the threshold (N−1), the CEL of the terminal device is a CEL N.

In a possible design, the processing module is further configured to: if the one or more measurement results are all less than or equal to the reference signal received power threshold, select a third reference signal less than or equal to the reference signal received power threshold, and determine the CEL of the terminal device based on a measurement result of the third reference signal and the CEL threshold. Alternatively, if the one or more measurement results are all less than or equal to the threshold (N−1), it indicates that a channel condition is poor, and the terminal device should skip performing random access or skip performing grant-free transmission this time.

In a possible design, if there are a plurality of measurement results less than or equal to the reference signal received power threshold, the measurement result of the third reference signal is the largest value of the plurality of measurement results less than or equal to the reference signal received power threshold.

For beneficial effects of the fourth aspect and the possible designs, refer to corresponding descriptions of the second aspect. Details are not described again.

According to a fifth aspect, an embodiment of this application provides an apparatus. The apparatus includes a communication interface and a processor, and the communication interface is used by the apparatus to communicate with another device, for example, to send and receive data or a signal. For example, the communication interface may be a transceiver, a circuit, a bus, a module, or a communication interface of another type, and the another device may be a network device. The processor is configured to invoke a group of programs, instructions, or data to perform the method described in the first aspect. The apparatus may further include a memory, configured to store the programs, the instructions, or the data invoked by the processor. The memory is coupled to the processor. When executing the instructions or the data stored in the memory, the processor may implement the method described in any one of the first aspect, the second aspect, the possible designs of the first aspect, or the possible designs of the second aspect.

According to a sixth aspect, an embodiment of this application further provides a computer-readable storage medium, where the computer storage medium stores computer-readable instructions, and when the computer-readable instructions are run on a computer, the computer is enabled to perform the method according to any one of the first aspect, the second aspect, the possible designs of the first aspect, or the possible designs of the second aspect.

According to a seventh aspect, an embodiment of this application provides a chip, where the chip includes a processor, the chip is connected to a memory, or the chip includes the memory, and is configured to implement the method according to any one of the first aspect, the second aspect, the possible designs of the first aspect, or the possible designs of the second aspect.

According to an eighth aspect, a computer program product including instructions is provided. When the computer program product runs on a computer, the method according to any one of the foregoing aspects and the possible designs of the foregoing aspects is performed.

BRIEF DESCRIPTION OF DRAWINGS

FIG. 1 is a schematic diagram of an architecture of a communication system according to an embodiment of this application;

FIG. 2 is a first schematic flowchart of a method for determining a coverage enhancement level according to an embodiment of this application;

DESCRIPTION OF EMBODIMENTS

Figure 3:
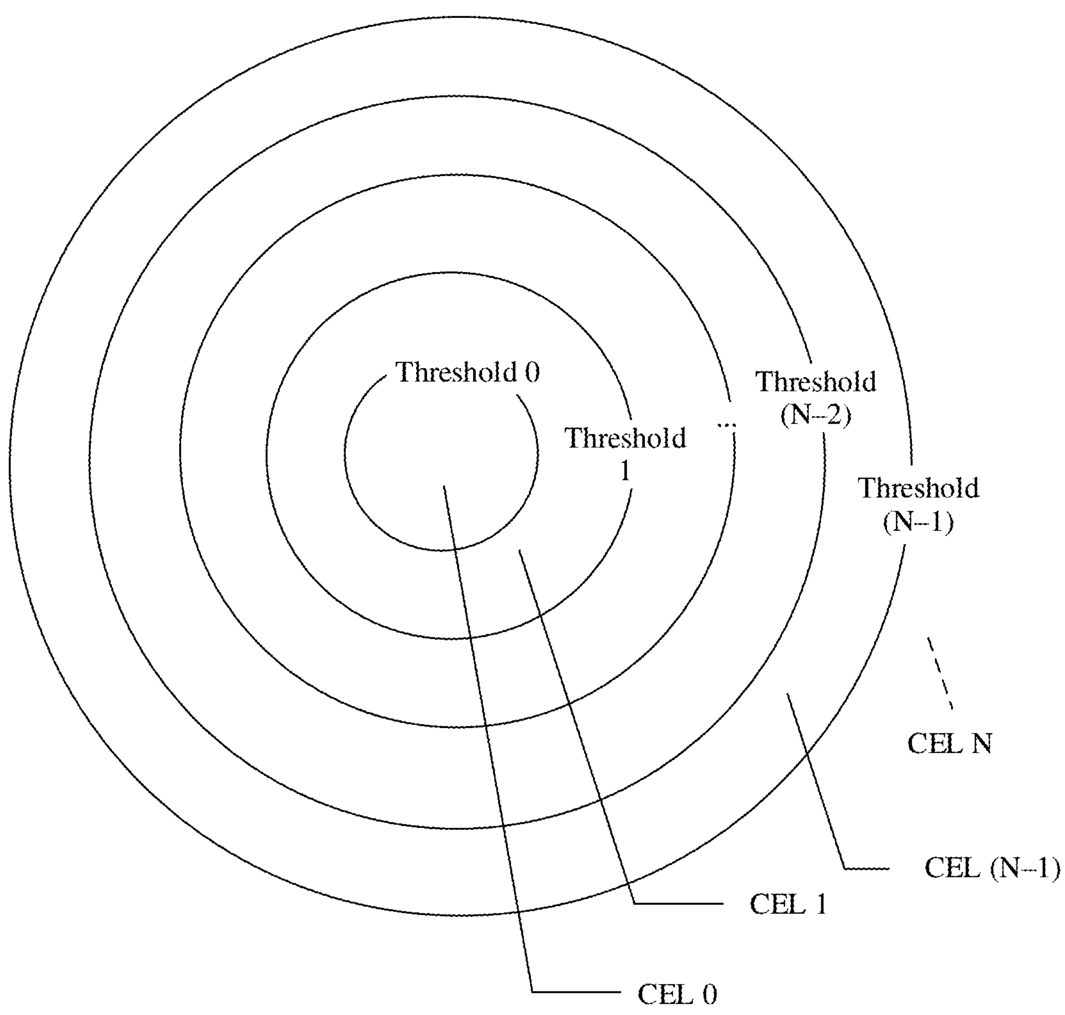
FIG. 3 is a schematic diagram of a correspondence between a coverage enhancement level and a threshold according to an embodiment of this application.

Embodiments of this application provide a method for determining a coverage enhancement level and an apparatus. The method and the apparatus are based on a same idea. The method and the apparatus have similar principles for resolving problems. Therefore, for implementations of the apparatus and the method, refer to each other. Details of repeated parts are not described.

In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more. In addition, it should be understood that in description of this application, terms such as "first" and "second" are merely used for distinguishing and description, but should not be understood as indicating or implying relative importance, or should not be understood as indicating or implying a sequence.

In embodiments of this application, when two values are compared, different comparison results correspond to different cases, and the comparison results may include four relationships. For example, two values are represented by a and b, and comparison results of a and b may include: a is greater than or equal to b, a is less than b, a is greater than b, and a is less than or equal to b. That a is greater than or equal to b corresponds to a case 1, and that a is less than b corresponds to a case 2. It may be considered that there is another alternative solution: That a is greater than b corresponds to a case 1, and that a is less than or equal to b corresponds to a case 2.

The method for determining a coverage enhancement level provided in embodiments of this application may be applied to a 4th generation (4th generation, 4G) communication system, for example, a long term evolution (long term evolution, LTE) system, or may be applied to a 5th generation (5th generation, 5G) communication system, for example, 5G new radio (new radio, NR), or applied to various future communication systems, for example, a 6th generation (6th generation, 6G) communication system.

FIG. 1 shows an architecture of a communication system to which embodiments of this application are applicable. As shown in FIG. 1, a communication system 100 includes a network device 101 and a terminal 102. The network device 101 provides a service for the terminal 102 within the coverage area of the network device 101. For example, refer to FIG. 1. The network device 101 provides wireless access for one or more terminals 102 within the coverage area of the network device 101.

The network device 101 is a node in a radio access network (radio access network, RAN), and may also be referred to as a base station or a RAN node (or device). Currently, some examples of the network device 101 are a next generation NodeB (next generation nodeB, gNB), a next generation evolved NodeB (next generation evolved nodeB, Ng-eNB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), or a wireless fidelity (wireless fidelity, Wi-Fi) access point (access point, AP). The network device 101 may alternatively be a satellite, and the satellite may also be referred to as a high-altitude platform, a high-altitude aircraft, or a satellite base station. The network device 101 may alternatively be another device having a network device function. For example, the network device 101 may alternatively be a device that has the network device function in D2D communication. Alternatively, the network device 101 may be a network device in a possible future communication system.

In some deployments, the network device may include a central unit (central unit, CU) and a distributed unit (distributed unit, DU). The network device may further include an active antenna unit (active antenna unit, AAU). The CU implements some functions of the network device, and the DU implements some other functions of the network device. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (radio access network, RAN), or the CU may be classified into a network device in a core network (core network, CN). This is not limited in this application.

The terminal 102 is also referred to as user equipment (user equipment, UE), a mobile station (mobile station, MS), a mobile terminal (mobile terminal, MT), or the like, and is a device that provides a user with voice and/or data connectivity. For example, the terminal 102 includes a handheld device or a vehicle-mounted device having a wireless connection function. Currently, the terminal 102 may be a mobile phone (mobile phone), a tablet computer, a notebook computer, a palmtop computer, a mobile internet device (mobile internet device, MID), a wearable device (such as a smartwatch, a smart band, or a pedometer), a vehicle-mounted device (such as a car, a bicycle, an electric vehicle, an airplane, a ship, a train, or a high-speed train), a virtual reality (virtual reality, VR) device, an augmented reality (augmented reality, AR) device, a wireless terminal in industrial control (industrial control), a smart home device (such as a refrigerator, a television, an air conditioner, or an electricity meter), an intelligent robot, a workshop device, a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a flight device (such as an intelligent robot, a hot balloon, an uncrewed aerial vehicle, or an aircraft), or the like. The terminal 102 may alternatively be another device having a terminal function. For example, the terminal 102 may alternatively be a device that has the terminal function in D2D communication.

It should be noted that the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The following first describes concepts of grant-free transmission (grant-free transmission) and a coverage enhancement level (coverage enhancement level, CEL).

The grant-free transmission may also be uplink transmission with a configured grant, uplink transmission with a preconfigured grant, uplink transmission without a dynamic grant, or uplink transmission without dynamic scheduling. The grant-free transmission is relative to uplink transmission with dynamic scheduling. A preconfigured transmission parameter is used for each grant-free transmission, and there is no need to receive a dynamic grant to obtain a transmission parameter required for the uplink transmission. In an embodiment, the grant-free transmission may be uplink transmission with a configured grant or uplink transmission without a dynamic grant in a connected state (connected) or a non-connected state (for example, an inactive state (inactive state) or an idle state (idle state)).

The CEL may also be referred to as an enhanced coverage level (enhanced coverage level, ECL), and the two names indicate a same meaning. In this application, the coverage enhancement level may also be referred to as a repetition number (repetition number) or a level of the repetition number. In this specification, only the CEL is used as an example for description.

Generally, a terminal supporting enhanced coverage (or coverage enhancement) may be in a normal coverage area, or may be in an enhanced coverage area. Area division is performed on a coverage area of a network device, or area division is performed on a range in which the terminal device is located, and the range may be divided into a plurality of CELs.

A CEL in which the terminal device is located may also be briefly described as a CEL of the terminal device. Signal quality measured by terminal devices in different CELs is different.

In an embodiment, the terminal device may obtain signal quality of a cell-specific reference signal (cell-specific reference signal, CRS) by measuring the CRS, and determine, by comparing the signal quality of the CRS with a specified threshold, the CEL in which the terminal device is located. For example, the signal strength may be reference signal received power (reference signal received power, RSRP) of the cell. N RSRP thresholds are set, and may be denoted as RSRP 0, RSRP 1, . . . , and RSRP (N−1), where RSRP 0≥RSRP 1≥ . . . ≥RSRP (N−1), and a measurement result of measuring the CRS by the terminal device is represented by RSRP.

If the RSRP≥the RSRP 0, the CEL of the terminal device is a CEL 0.

If the RSRP 1≤the RSRP<the RSRP 0, the CEL of the terminal device is a CEL 1.

. . .

If the RSRP (N−1)≤the RSRP<the RSRP (N−2), the CEL of the terminal device is (N−1).

In the solution in which the CEL of the terminal device is determined by measuring the RSRP of the CRS, although the CRS has a plurality of ports, because there is no binding relationship between the ports and beams, the terminal device uses only a port 0 for RSRP measurement, or the terminal device uses a port 0 and a port 1 for RSRP measurement, and each terminal device can obtain only one measurement result.

However, in some communication scenarios, one terminal device may obtain a plurality of measurement results. For example, in NR, because a quantity of antennas is further increased, the network device sends a synchronization signal block (SS/PBCH block, SSB) in a beam sweeping manner, and each SSB corresponds to a transmit beam of one network device. Therefore, the terminal device measures a plurality of SSBs, to obtain measurement results of the plurality of SSBs. How the terminal device determines the coverage level of the terminal device by using the plurality of measurement results is a problem to be considered.

Based on this, an embodiment of this application provides a method for determining a coverage enhancement level. In this method, a terminal device can determine a CEL of the terminal device in different communication scenarios. As shown in FIG. 2, a flowchart of the method for determining a coverage enhancement level according to this embodiment of this application is as follows.

S201: A terminal device obtains one or more measurement results respectively corresponding to one or more reference signals.

The reference signal is a signal sent by a network device for discovery and measurement performed by another device or a signal sent by a network device for access of the terminal device. In NR, a primary synchronization signal (primary synchronization signal, PSS), a secondary synchronization signal (secondary synchronization signal, SSS), and a physical broadcast channel (physical broadcast channel, PBCH) are referred to as a synchronization signal/broadcast signal block (synchronization signal/PBCH block, SS/PBCH block). For ease of description, the SS/PBCH block may be referred to as an SSB. The reference signal may be an SSB, or may be a channel state information reference signal (channel state information reference signal, CSI-RS), a demodulation reference signal (demodulation reference Signal, DMRS), a sounding reference signal (sounding reference signal, SRS), or another type of reference signal. In this embodiment of this application, an example in which the reference signal is an SSB is used for description. The network device may send the SSB on each transmit beam. In other words, the network device may separately send the SSB by using each transmit beam. The terminal device measures the SSB sent by the network device, to obtain measurement results of the SSBs on a plurality of beams. In an embodiment, the measurement result of the SSB is a measurement result obtained by measuring at least one of the PSS, the SSS, and the PBCH-DMRS in the SSB.

The measurement result may include a parameter that can reflect signal quality, such as reference signal received power, a reference signal signal-to-interference-plus-noise ratio (reference signal signal-to-interference-plus-noise ratio, RS-SINR), reference signal received quality (reference signal received quality, RSRQ), or a reference signal received signal strength indicator (reference signal received signal strength indicator, RS-RSSI). For example, the measurement result may be RSRP.

S202: The terminal device determines a CEL of the terminal device based on the one or more measurement results obtained in S201 and at least one of N thresholds.

N is a positive integer, and the N thresholds are a threshold 0, a threshold 1, . . . , and a threshold (N−1) in descending order, that is, the threshold 0>the threshold 1> . . . >the threshold (N−1). The N thresholds may be configured by the network device for the terminal device, or may be agreed on by the terminal device and the network device in advance. It may be understood that the threshold and the measurement result belong to parameters of a same type. For example, if the measurement result refers to an RSRP measurement result, the threshold is an RSRP threshold, for example, the N thresholds are an RSRP threshold 0, an RSRP threshold 1, . . . , and an RSRP threshold (N−1). If the measurement result refers to an SNR measurement result, the threshold is an SNR threshold, for example, the N thresholds are an SNR threshold 0, an SNR threshold 1, . . . , and an SNR threshold (N−1).

FIG. 3 shows a correspondence between N thresholds and CELs. The N thresholds may correspond to N CELs or (N+1) CELs.

Manner 1: (1) A relationship between a threshold and a CEL is that N thresholds correspond to N CELs. A specific case is as follows: If the measurement result is greater than or equal to the threshold 0, the CEL is specifically a CEL 0; if the measurement result is greater than or equal to a threshold (i+1) and less than a threshold i, the CEL is specifically a CEL (i+1), where a value of i is an integer from 0 to (N−2). (2) A relationship between a threshold and a CEL is that N thresholds correspond to (N+1) CELs. A specific case is as follows: If the measurement result is greater than or equal to the threshold 0, the CEL is specifically a CEL 0; if the measurement result is greater than or equal to a threshold (i+1) and less than a threshold i, the CEL is specifically a CEL (i+1), where a value of i is an integer from 0 to (N−2), for example, i is an integer from 0 to (N−2) in sequence; if the measurement result is less than the threshold (N−1), the CEL is specifically a CEL N.

Manner 2: (1) A relationship between a threshold and a CEL is that N thresholds correspond to N CELs. A specific case is as follows: If the measurement result is greater than the threshold 0, the CEL is a CEL 0; if the measurement result is greater than a threshold (i+1) and less than or equal to a threshold i, the CEL is a CEL (i+1), where a value of i is an integer from 0 to (N−2), for example, an integer from 0 to (N−2) is sequentially taken as the value of i. (2) A relationship between a threshold and a CEL is that N thresholds correspond to (N+1) CELs. A specific case is as follows: If the measurement result is greater than the threshold 0, the CEL is a CEL 0; if the measurement result is greater than a threshold (i+1) and less than or equal to a threshold i, the CEL is a CEL (i+1), where a value of i is an integer from 0 to (N−2), for example, an integer from 0 to (N−2) is sequentially taken as the value of i; if the measurement result is less than or equal to the threshold (N−1), the CEL is a CEL N.

The manner 1 is used as an example for description of this embodiment of this application, and various implementation details in the manner 1 may be applied to the manner 2.

For example, N=4, and four thresholds correspond to four CELs. Specifically, if the measurement result is greater than or equal to the threshold 0, the CEL is specifically the CEL 0; if the measurement result is greater than or equal to the threshold 1 and less than the threshold 0, the CEL is specifically a CEL 1; if the measurement result is greater than or equal to a threshold 2 and less than the threshold 1, the CEL is specifically a CEL 2; if the measurement result is greater than or equal to a threshold 3 and less than the threshold 2, the CEL is specifically a CEL 3; if the measurement result is greater than or equal to a threshold 4 and less than the threshold 3, the CEL is specifically corresponding to a CEL 4.

For example, N=4, and four thresholds correspond to five CELs. Specifically, if an area whose measurement result is greater than or equal to the threshold 0 corresponds to the CEL 0, if an area whose measurement result is greater than or equal to the threshold 1 and less than the threshold 0 corresponds to a CEL 1, if the measurement result is greater than or equal to a threshold 2 and less than the threshold 1, the CEL is specifically a CEL 2; if the measurement result is greater than or equal to a threshold 3 and less than the threshold 2, the CEL is specifically a CEL 3; if the measurement result is greater than or equal to a threshold 4 and less than the threshold 3, the CEL is specifically a CEL 4; if the measurement result is less than the threshold 4, the CEL is specifically a CEL 5.

In this way, it may be considered that one CEL corresponds to one threshold or corresponds to two thresholds. The CEL 0 corresponds to one threshold, namely, the threshold 0; the CEL N corresponds to one threshold, namely, the threshold (N−1), and other CELs all correspond to two thresholds. For example, the CEL 1 corresponds to the threshold 0 and the threshold 1, and the CEL 2 corresponds to the threshold 1 and the threshold 2.

In S202, the terminal device may determine the CEL of the terminal device according to the following method. If there is a measurement result greater than or equal to the threshold 0 in the one or more measurement results obtained in S201, the CEL of the terminal device is the CEL 0; or if the one or more measurement results obtained in S201 are all less than the threshold i, and there is a measurement result greater than or equal to the threshold (i+1) in the one or more measurement results obtained in S201, the CEL of the terminal device is the CEL (i+1), and a value of i is an integer from 0 to (N−2), for example, an integer from 0 to (N−2) is sequentially taken as the value of i. Optionally, when the N thresholds correspond to (N+1) CELs, a case may be further included. If the one or more measurement results obtained in S201 are all less than the threshold (N−1), the CEL of the terminal device is the CEL N.

In an optional implementation, the terminal device may sequentially determine, in descending order of the N thresholds, whether there is a measurement result greater than a threshold, and if there is a measurement result greater than a threshold, determine that the CEL of the terminal device is a level corresponding to the threshold. In this case, if there is a measurement result greater than or equal to the threshold 0 in the one or more measurement results obtained in S201, the CEL of the terminal device is the CEL 0; or if the one or more measurement results obtained in S201 are all less than the threshold i, and there is a measurement result greater than or equal to the threshold (i+1) in the one or more measurement results obtained in S201, the CEL of the terminal device is the CEL (i+1), and an integer from 0 to (N−2) is sequentially taken as a value of i. Optionally, when the N thresholds correspond to (N+1) CELs, a case may be further included. If the one or more measurement results obtained in S201 are all less than the threshold (N−1), the CEL of the terminal device is the CEL N.

In the embodiment of FIG. 2, the terminal device sequentially determines, in descending order of thresholds, whether there is a measurement result greater than or equal to a threshold, to determine the CEL of the terminal device. In this method, regardless of whether the terminal device receives one or more reference signals, the CEL of the terminal device can be obtained by comparing a measurement result of a signal with a specified threshold. This method can be widely applied to more communication scenarios. When the terminal device obtains a plurality of measurement results of a plurality of reference signals, if the foregoing method for determining the CEL by comparing a signal quality of a CRS with a specified threshold is used, and each measurement result is separately compared with the N thresholds, a plurality of CELs may be obtained. According to the method in this embodiment of FIG. 2, a CEL finally determined by the terminal device is the lowest value in the plurality of CELs. A lower CEL value corresponds to a higher threshold and a better measurement result. When the CEL corresponds to a repetition number, the CEL determined by the terminal device can correspond to a smaller repetition number, to avoid excessive repetitions. In this way, resource utilization can be improved, and interference to another terminal device can be reduced.

The following describes some optional implementations and examples of some application scenarios of the embodiment of FIG. 2.

When the terminal device receives reference signals that correspond to a plurality of beams and that are sent by the network device, the terminal device needs to select one reference signal, and report the reference signal to the network device. Generally, a reference signal received power threshold may be set. The terminal device compares received reference signal received power with the reference signal received power threshold, determines a beam gain in each direction. It is considered that a better beam gain is obtained for a beam corresponding to a reference signal with received power greater than or equal to the reference signal received power threshold. The terminal device selects a beam corresponding to a reference signal with best or better received power, and notifies the network device of the beam.

In the embodiment of FIG. 2, the terminal device determines the CEL of the terminal device. Further, the terminal device may select a reference signal corresponding to a measurement result that is greater than or equal to a minimum threshold corresponding to the CEL of the terminal device. The terminal device may select a reference signal corresponding to a maximum measurement result greater than or equal to the minimum threshold corresponding to the CEL of the terminal device, or the terminal device may select a reference signal corresponding to any measurement result greater than or equal to the minimum threshold corresponding to the CEL of the terminal device. In this case, the terminal device does not need to select the reference signal based on the reference signal received power threshold.

The CEL of the terminal device is the CEL 0, and the CEL 0 corresponds to only one threshold, namely, the threshold 0. In this case, a minimum threshold corresponding to the CEL 0 is the threshold 0. The other CELs all correspond to two thresholds. For example, the CEL 1 corresponds to the threshold 0 and the threshold 1, and the threshold 0 is greater than the threshold 1. If the CEL of the terminal device is the CEL 1, a minimum threshold corresponding to the CEL 1 is the threshold 1.

If the one or more measurement results obtained by the terminal device in S201 are all less than the threshold (N−1), the terminal device selects a reference signal corresponding to any one of the one or more measurement results, or the terminal device selects a reference signal corresponding to the largest measurement result in the one or more measurement results, or the terminal device skips performing random access or skips performing grant-free transmission this time. For example, when the N thresholds correspond to (N+1) CELs, the CEL of the terminal device is the CEL N, the CEL N corresponds to only one threshold, namely, the threshold (N−1), and the one or more measurement results of the terminal device are all less than the threshold (N−1), the terminal device may select a reference signal according to the method described in this paragraph or may not perform random access or grant-free transmission.

The following further describes the embodiment of FIG. 2 in detail by using an example.

It is assumed that N thresholds correspond to (N+1) CELs, and N=2, so that two thresholds correspond to three CELs. The reference signal is an SSB, and the terminal device receives three SSBs: an SSB 1, an SSB 2, and an SSB 3. RSRP of the SSB 1 is RSRP 1, RSRP of the SSB 2 is RSRP 2, and RSRP of the SSB 3 is RSRP 3.

Figure 4:
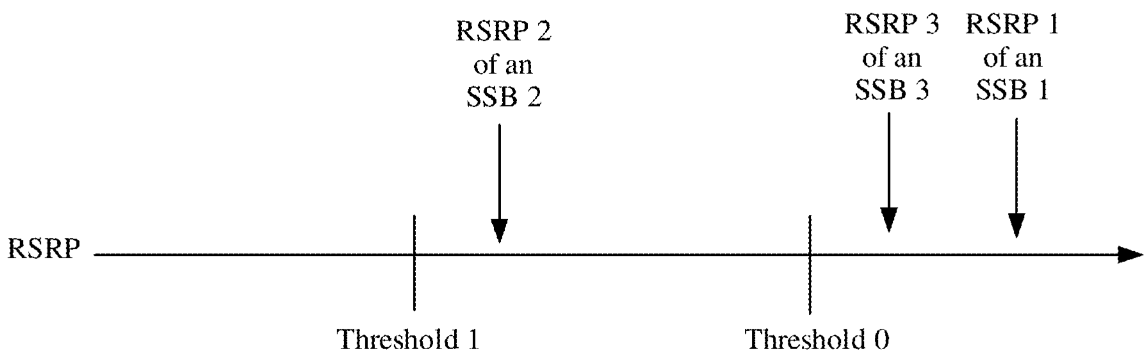
FIG. 4 is a first schematic diagram of an example of a method for determining a coverage enhancement level according to an embodiment of this application.

As shown in FIG. 4, it is assumed that the RSRP 1 and the RSRP 3 are greater than the threshold 0, and the RSRP 2 is less than the threshold 0 and greater than the threshold 1. In this case, the terminal device determines that the CEL of the terminal device is the CEL 0, and the terminal device randomly selects one SSB from the SSB 1 and the SSB 3, or the terminal device selects an SSB corresponding to the larger RSRP in the RSRP 1 and the RSRP 3.

Figure 5:
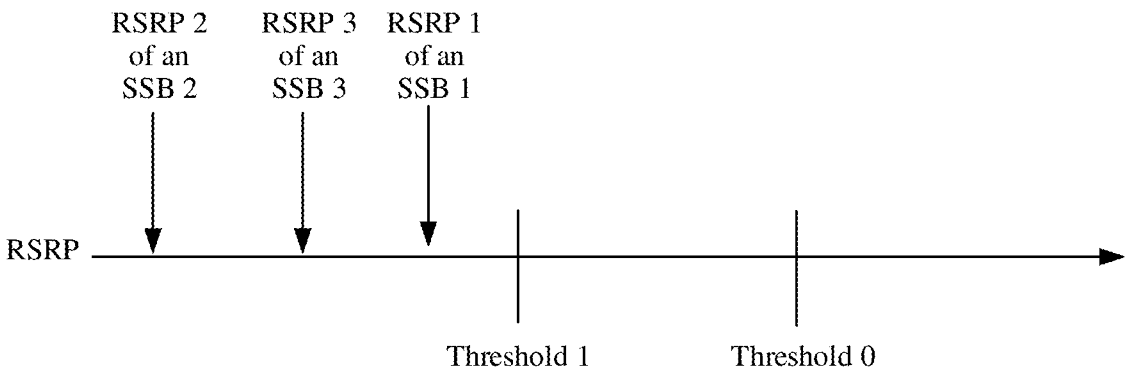
FIG. 5 is a second schematic diagram of an example of a method for determining a coverage enhancement level according to an embodiment of this application.

As shown in FIG. 5, it is assumed that the RSRP 1, the RSRP 2, and the RSRP 3 are all less than the threshold 1, the CEL of the terminal device is the CEL 2. Similarly, the terminal device may randomly select one SSB from the SSB 1 and the SSB 3, or the terminal device selects an SSB corresponding to the larger RSRP in the RSRP 1 and the RSRP 3, or the terminal device does not select an SSB, that is, does not perform random access this time.

It is assumed that N thresholds correspond to N CELs, and N=2, so that two thresholds correspond to two CELs. The reference signal is an SSB, and the terminal device receives three SSBs: an SSB 1, an SSB 2, and an SSB 3. RSRP of the SSB 1 is RSRP 1, RSRP of the SSB 2 is RSRP 2, and RSRP of the SSB 3 is RSRP 3.

As shown in FIG. 5, it is assumed that the RSRP 1, the RSRP 2, and the RSRP 3 are all less than the threshold 1, the CEL of the terminal device is the CEL 1. Similarly, the terminal device may randomly select one SSB from the SSB 1 and the SSB 3, or the terminal device selects an SSB corresponding to the larger RSRP in the RSRP 1 and the RSRP 3, or the terminal device does not select an SSB, that is, does not perform random access this time.

Figure 6:
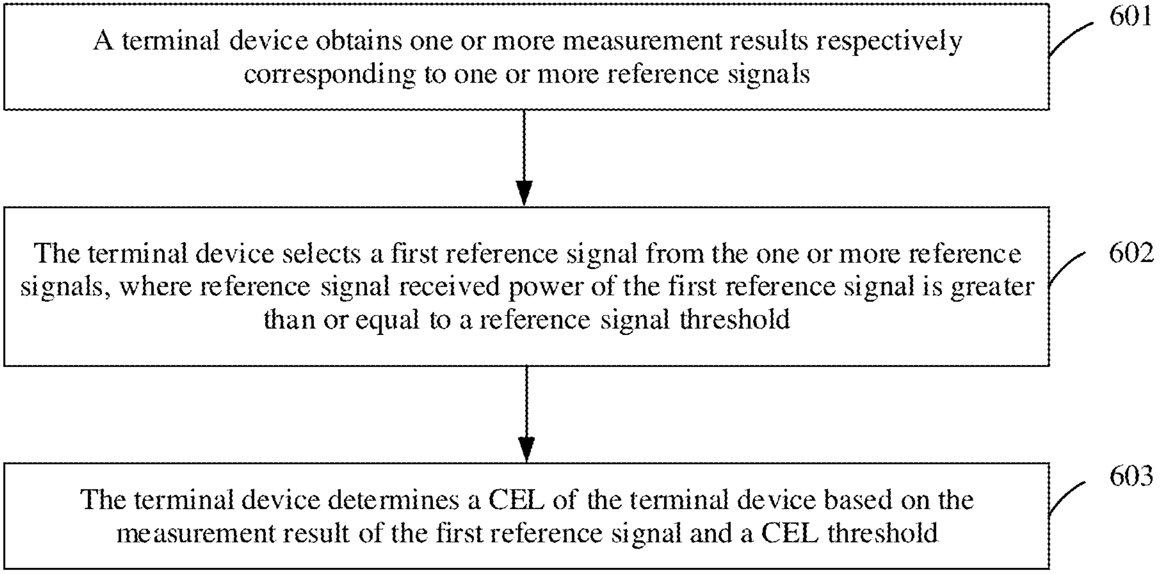
FIG. 6 is a second schematic flowchart of a method for determining a coverage enhancement level according to an embodiment of this application.

Based on a same technical concept as that of the embodiment of FIG. 2, as shown in FIG. 6, an embodiment of this application provides another method for determining a coverage enhancement level. A specific procedure is as follows.

S601: A terminal device obtains one or more measurement results respectively corresponding to one or more reference signals.

For this step, refer to the descriptions of S201.

S602: The terminal device selects a first reference signal from the one or more reference signals in S601, where reference signal received power of the first reference signal is greater than or equal to a reference signal received power threshold.

S603: The terminal device determines a CEL of the terminal device based on a measurement result of the first reference signal and a CEL threshold.

In a possible design, the first reference signal may alternatively be any one of the one or more reference signals obtained in S601. In this manner, maximum freedom may be given to the terminal device, and the terminal device may determine the CEL to be selected by comprehensively considering factors such as a latency and RSRP.

The reference signal received power threshold and the CEL threshold are different thresholds. The reference signal received power threshold is used to select the first reference signal from the received one or more reference signals, and the CEL threshold is used to determine the CEL of the terminal device. The reference signal received power threshold and the CEL threshold may be configured by a network device for the terminal device, or may be agreed on by the terminal device and the network device in advance. In a possible design, the reference signal received power threshold may be a value in the CEL threshold. In this way, only the CEL threshold needs to be configured, and a value in the CEL threshold is indicated as the reference signal received power threshold, to reduce signaling overheads.

In the embodiment of FIG. 6, the first reference signal is selected from the received one or more reference signals, and then the CEL of the terminal device is determined based on the first reference signal and the CEL threshold. Regardless of whether the terminal device receives one or more reference signals, the CEL of the terminal device can be determined. This method can be widely applied to more communication scenarios.

For the CEL threshold, refer to the threshold described in the embodiment of FIG. 2. For example, there may be N CEL thresholds, and the N thresholds are sequentially a threshold 0, a threshold 1, . . . , and a threshold (N−1) in descending order, that is, the threshold 0>the threshold 1> . . . >the threshold (N−1). The N thresholds may be configured by the network device for the terminal device, or may be agreed on by the terminal device and the network device in advance. The N thresholds may correspond to N CELs or (N+1) CELs. For a specific corresponding method and explanations, refer to the descriptions of FIG. 3.

The terminal device determines the CEL of the terminal device based on the measurement result of the first reference signal and the CEL threshold. This is not limited in this embodiment of this application. For example, the CEL threshold includes N thresholds, and the N thresholds are a threshold 0, a threshold 1, . . . , and a threshold (N−1) in descending order. If the measurement result of the first reference signal is greater than or equal to the threshold 0, the CEL of the terminal device is a CEL 0; if the measurement result of the first reference signal is less than a threshold i and greater than or equal to a threshold (i+1), the CEL of the terminal device is a CEL (i+1), where a value of i is an integer from 0 to (N−2), for example, an integer from 0 to (N−2) is sequentially taken as the value of i. For another example, the CEL threshold includes (N+1) thresholds, and the N thresholds are a threshold 0, a threshold 1, . . . , a threshold (N−1), and a threshold N in descending order. If the measurement result of the first reference signal is greater than or equal to the threshold 0, the CEL of the terminal device is a CEL 0; if the measurement result of the first reference signal is less than a threshold i and greater than or equal to a threshold (i+1), the CEL of the terminal device is a CEL (i+1), where a value of i is an integer from 0 to (N−2), for example, an integer from 0 to (N−2) is sequentially taken as the value of i; if the measurement result of the first reference signal is less than the threshold (N−1), the CEL of the terminal device is a CEL N.

In S602, the terminal device selects the first reference signal based on the reference signal received power threshold, and the CEL determined based on the measurement result of the first reference signal and the CEL threshold may not be a maximum CEL that can be determined based on measurement results of the one or more reference signals. For example, measurement results of the first reference signal and a second reference signal are greater than the reference signal received power threshold, the measurement result of the second reference signal is greater than the measurement result of the first reference signal, a CEL that can be determined by the terminal device based on the measurement result of the second reference signal and the CEL threshold is greater than a CEL that can be determined by the terminal device based on the measurement result of the first reference signal and the CEL threshold. However, according to the method provided in the embodiment of FIG. 6, the terminal device can have higher selection freedom, and can determine a CEL is to be selected by considering factors such as a latency and RSRP. In addition, if a resource of the first reference signal is before a resource of the second reference signal, the terminal device selects the first reference signal, so that a latency can be reduced. In another embodiment of this application, the terminal device may select the first reference signal based on another measurement value (for example, RSRQ, an RS-SINR, or an RS-RSSI) that can reflect signal quality. Correspondingly, the reference signal received power threshold in step S602 is replaced with a threshold corresponding to another measurement value.

In an implementation, the measurement result is specifically RSRP. In this implementation, there may be the following case for the measurement results corresponding to the one or more reference signals obtained in step S601: There is a measurement result greater than or equal to the reference signal received power threshold in the foregoing measurement results, or all measurement results obtained in S601 are less than the reference signal received power threshold. When the measurement results obtained in step S601 includes the measurement result greater than or equal to the reference signal received power threshold, in S602, the terminal device selects the first reference signal in the one or more reference signals obtained in S601, where the measurement result of the first reference signal is greater than or equal to the reference signal received power threshold. In another case, if the measurement results corresponding to the obtained one or more reference signals selected by the terminal device in S601 are all less than the reference signal received power threshold, there may be the following several possible processing manners.

Manner 1: The terminal device may select a third reference signal whose measurement result is less than the reference signal received power threshold. To be specific, the terminal device selects one third reference signal from the one or more reference signals obtained in S601, where the measurement result of the third reference signal is less than the reference signal received power threshold, and the terminal device determines the CEL of the terminal device based on the measurement result of the third reference signal and the CEL threshold. For the method for determining, by the terminal device, the CEL of the terminal device based on the measurement result of the third reference signal and the CEL threshold, refer to the method for determining, by the terminal device, the CEL of the terminal device based on the measurement result of the first reference signal and the CEL threshold. Optionally, the third reference signal selected by the terminal device may be a reference signal corresponding to the largest value of the reference signal received power threshold in the foregoing one or more measurement results, to improve an access success rate or a grant-free data transmission success rate.

Manner 2: The terminal device does not perform random access this time, or the terminal device does not perform grant-free transmission this time.

When the measurement result of the one or more reference signals obtained by the terminal device in S601 are all less than the reference signal received power threshold, it indicates that channel quality is poor and an access success rate is very low, and the terminal device may skip performing random access or skip performing grant-free transmission this time. In this way, interference to another terminal device can be reduced.

Manner 3: If there is a measurement result greater than or equal to the threshold 0 in the one or more measurement results obtained in S601, the CEL of the terminal device is the CEL 0; or if the one or more measurement results obtained in S601 are all less than the threshold i, and there is a measurement result greater than or equal to the threshold (i+1), the CEL of the terminal device is the CEL (i+1), and a value of i is an integer from 0 to (N−2), for example, an integer from 0 to (N−2) is sequentially taken as the value of i. Optionally, when the N thresholds correspond to (N+1) CELs, a case may be further included. If the one or more measurement results obtained in S601 are all less than the threshold (N−1), the CEL of the terminal device is the CEL N. Further, the terminal device may select a reference signal corresponding to a measurement result that is greater than or equal to a minimum threshold corresponding to the CEL of the terminal device.

The following further describes the embodiment of FIG. 6 in detail by using an example.

It is assumed that the reference signal is an SSB, and the terminal device receives three SSBs: an SSB 1, an SSB 2, and an SSB 3. RSRP of the SSB 1 is RSRP 1, RSRP of the SSB 2 is RSRP 2, and RSRP of the SSB 3 is RSRP 3. The reference signal received power threshold is represented by an SSB threshold. Two CEL thresholds are a threshold 0 and a threshold 1.

Figure 7:
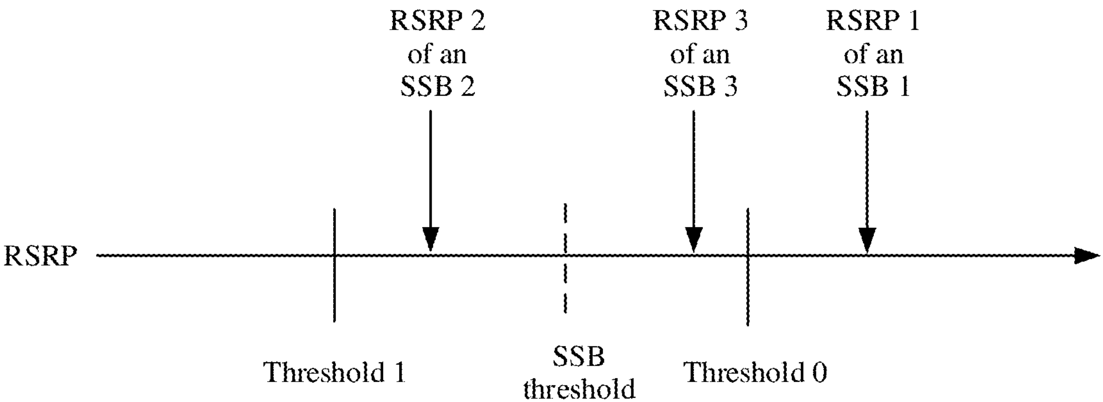
FIG. 7 is a third schematic diagram of an example of a method for determining a coverage enhancement level according to an embodiment of this application.

As shown in FIG. 7, it is assumed that the RSRP 1 is greater than the threshold 0, and both the RSRP 2 and the RSRP 3 are less than the threshold 0 and greater than the threshold 1. Both the RSRP 1 and the RSRP 3 are greater than the SSB threshold, and the RSRP 2 is less than the SSB threshold.

The terminal device selects either of the SSB 1 and the SSB 3 based on the SSB threshold. For example, if the terminal device selects the SSB 1, and further determines that the measurement result RSRP 1 of the SSB 1 is greater than the threshold 0, the terminal device determines that the CEL of the terminal device is a CEL 0. For another example, if the terminal device selects the SSB 3, and further determines that the measurement result RSRP 3 of the SSB 3 is less than the threshold 0 and greater than the threshold 1, the terminal device determines that the CEL of the terminal device is a CEL 1.

The terminal device may select one SSB from a plurality of SSBs whose RSRP is greater than the SSB threshold based on a factor latency. For example, if a resource of the SSB 3 is more conducive to latency reduction, although a best CEL cannot be determined when the terminal device selects the SSB 3, a latency can be reduced.

Figure 8:
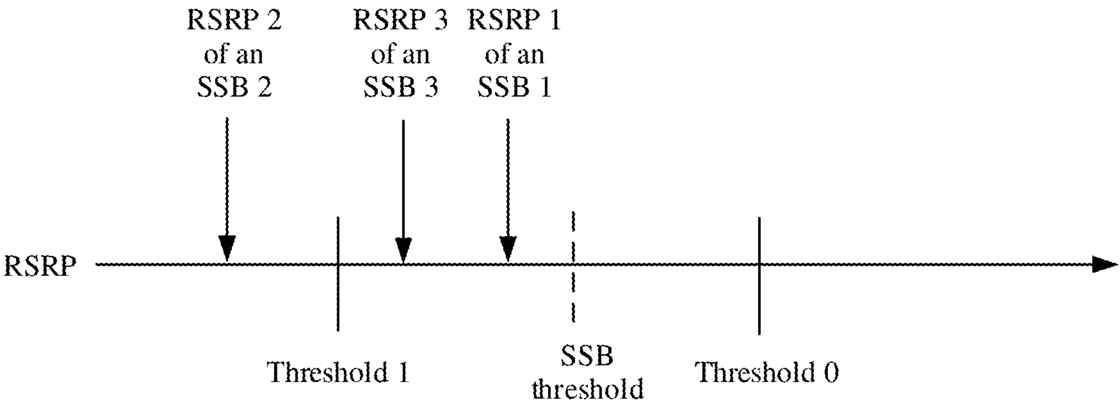
FIG. 8 is a fourth schematic diagram of an example of a method for determining a coverage enhancement level according to an embodiment of this application.

As shown in FIG. 8, it is assumed that the RSRP 1, the RSRP 2, and the RSRP 3 are all less than the SSB threshold, the RSRP 1 and the RSRP 3 are both less than the threshold 0 and greater than the threshold 1, and the RSRP 2 is less than the threshold 1.

Because RSRP of all SSBs is less than the SSB threshold, the terminal device may select an SSB with maximum RSRP, namely, the SSB 1. Further, if the RSRP 1 of the SSB 1 is less than the threshold 0 and greater than the threshold 1, it is determined that the CEL of the terminal device is the CEL 1. When RSRP of all SSBs is less than the SSB threshold, it indicates that channel quality of the terminal device is poor in this case. Therefore, a CEL corresponding to an SSB with maximum RSRP is selected, to improve an access success rate. Alternatively, because RSRP of all SSBs is less than the threshold 0, and there are SSBs whose RSRP are greater than the threshold 1, namely, the SSB 1 and the SSB 3, it is determined that the CEL of the terminal device is the CEL 1, and the terminal device may select one SSB, for example, the SSB 1, from the SSB 1 and the SSB 3. Alternatively, when RSRP of all SSBs is less than the SSB threshold, it indicates that channel quality of the terminal device is poor, and an access success rate is low. In this case, the terminal device may skip performing random access or skip performing grant-free transmission this time, or the network device rejects access of the terminal device, to avoid causing interference to another terminal device.

Based on the embodiments of FIG. 2 and FIG. 6, this embodiment of this application provides some optional implementations. Details are as follows.

In this embodiment of this application, the network device performs resource configuration for the terminal device based on the CEL of the terminal. The terminal device communicates with the network device based on a parameter corresponding to the CEL of the terminal device. Different CELs correspond to different parameters.

The CEL of the terminal device may correspond to a parameter of a physical channel. The physical channel may be used to carry a message for communication between the terminal device and the network device. The message may be a message in random access, for example, a message 1, a message 2, a message 3, or a message 4 in a four-step random access procedure, or a message A (MsgA) or a message B (MsgB) in a two-step random access procedure. Correspondingly, the physical channel may be a physical random access channel (physical random access channel, PRACH) for the message 1, a physical downlink control channel (physical downlink control channel, PDCCH) for the message 2, a physical downlink shared channel (physical downlink shared channel, PDSCH) for the message 2, a physical uplink shared channel (physical uplink shared channel, PUSCH) for the message 3, a PDCCH for the message 4, a PDSCH for the message 4, a PRACH for the MsgA, a PUSCH for the MsgA, a PDCCH for the MsgB, or a PDSCH for the MsgB in four-step random access. Alternatively, the physical channel may be a PUSCH, a PDCCH, or a PDSCH for grant-free transmission.

Parameters of the physical channel may include any one or more of the following parameters: a time domain resource, a frequency domain resource, a code domain resource, or a repetition number.

The terminal device may use, in communication, a parameter of a physical channel corresponding to the CEL of the terminal device. For example, the CEL of the terminal device corresponds to a repetition number of the PRACH for the message 1 in the four-step random access procedure. Different CELs correspond to different quantities of repetitions. It is assumed that a CEL 0 corresponds to a repetition number n0, a CEL 1 corresponds to a repetition number n1, a CEL 2 corresponds to a repetition number n2, and a CEL 3 corresponds to a repetition number n3. When the CEL of the terminal device is the CEL 3, the repetition number for sending the message 1 by the terminal device in the random access procedure is n3. The message 2, the message 4, and the message B each include two parts: a PDCCH and a PDSCH. The CEL of the terminal device may correspond to parameters of the two parts: the PDCCH and the PDSCH, or may correspond to only parameters of the PDCCH or the PDSCH.

For example, the terminal device may select a CEL according to the foregoing method embodiments during each random access or each grant-free transmission, or may select a reference signal (such as an SSB) according to the foregoing method embodiments. The terminal device may perform random access or grant-free transmission on the selected resources corresponding to the SSB and the CEL based on a repetition number corresponding to the CEL.

During random access, the terminal device may make a plurality of attempts. In a complete random access procedure, namely, a random access procedure triggered by a same event, sending a preamble (preamble) each time is counted as a random access attempt. In a complete random access procedure triggered by an event, initialization may be performed for only once, but one or more random access attempts may be performed. In initialization, a quantity of random access attempts is set to 1. Each time a random access attempt fails, the quantity of random access attempts increases by 1. Grant-free transmission is similar to a random access procedure. For a same transport block (transport block, TB), one grant-free transmission of the transport block is denoted as one grant-free transmission attempt, and the terminal device may make a plurality of grant-free attempts during grant-free transmission. In an embodiment, all times of sending (which may include one time of sending or a plurality of times of sending) for a same TB in a grant-free transmission resource periodicity is referred to as one grant-free transmission. In another embodiment, each time of sending of one TB in one grant-free transmission resource periodicity is referred to as one grant-free transmission. In a possible embodiment, the terminal device completes CEL selection and reference signal selection in an initialization phase of random access (or grant-free transmission), and does not change the selected CEL and reference signal during each attempt after the initialization. In another possible embodiment, the terminal device completes CEL selection and reference signal selection and update in a process of each random access attempt or grant-free transmission attempt.

For example, the terminal device updates the CEL of the terminal device in a process of a $K^{th}$ random access attempt or a $K^{th}$ grant-free transmission attempt. The updated CEL may be different from an initialized CEL or a CEL selected last time. K is a positive integer. Alternatively, the terminal device may reselect a reference signal in the process of the $K^{th}$ random access attempt or the $K^{th}$ grant-free transmission attempt.

For example, in the embodiment of FIG. 6, after selecting the first reference signal in S602, the terminal device selects a second reference signal in the process of the $K^{th}$ random access attempt or the $K^{th}$ grant-free transmission attempt, and updates the CEL of the terminal device based on the measurement result of the second reference signal and the CEL threshold. For a method for updating the CEL of the terminal device, refer to the method for determining the CEL of the terminal device based on the measurement result of the first reference signal and the CEL threshold.

In a process of each random access attempt or grant-free transmission attempt, the terminal device may determine transmit power in a current attempt based on a power ramp amount. The terminal device needs to maintain a power ramp counter, and determine, based on a power ramp step and a count value of the power ramp counter, a power ramp amount of the transmit power in a current attempt relative to initial transmit power. For example, the power ramp amount relative to the initial transmit power=(the count value of the power ramp counter−1)×the power ramp step. Equivalently, a power ramp amount relative to the transmit power obtained after the previous power ramp=the power ramp step. If the selected CEL and reference signal are not changed during each attempt after the initialization, in this scenario, the terminal device only needs to maintain one power ramp counter and use one power ramp step. In a process of each random access attempt or grant-free transmission attempt, the CEL of the terminal device may be updated, or a reference signal may be reselected. In this scenario, because a different CEL may be selected in each attempt, different reference signals may be selected, and transmit power needed by each beam may be different, it may be set that each CEL corresponds to one power ramp step, and each CEL corresponds to one power ramp counter. To be specific, a CEL 0 to a CEL (N−1) are respectively in a one-to-one correspondence with N power ramp steps, and the CEL 0 to the CEL (N−1) are respectively in a one-to-one correspondence with N power ramp counters. When there are (N+1) CELs, the CEL 0 to the CEL N are respectively in a one-to-one correspondence with (N+1) power ramp steps, and the CEL 0 to the CEL N are respectively in a one-to-one correspondence with (N+1) power ramp counters. Optionally, two or more CELs may correspond to a same power ramp step. Alternatively, two or more CELs may correspond to a same power ramp counter. Certainly, it may also be set that the CEL 0 to the CEL (N−1) correspond to a same power ramp step, and the CEL 0 to the CEL (N−1) correspond to a same power ramp counter. When there are (N+1) CELs, it may be set that the CEL 0 to the CEL N correspond to a same power ramp step, and the CEL 0 to the CEL N correspond to a same power ramp counter.

A PRACH channel in a random access procedure is used as an example. In an embodiment, the terminal device maintains only one power ramp counter and one power ramp step. Except in an initialization phase, each time the terminal device makes a random access attempt, if the terminal device does not receive a notification of suspending power ramp from a physical layer, the terminal device increases the power ramp counter by 1, calculates a power ramp amount, and determines transmit power in this attempt based on the power ramp amount.

In another embodiment, the terminal device maintains a power ramp counter and a power ramp step for each CEL. In addition to a random access initialization phase of each CEL, each time the terminal device performs a random access attempt, if the terminal device does not receive a notification of suspending power ramp from a physical layer, the terminal device increases only a power ramp counter corresponding to a current CEL by 1, calculates a power ramp amount based on a power ramp step and a value of the counter that correspond to the current CEL, and determines transmit power in this attempt based on the power ramp amount.

Optionally, the terminal device may maintain only one power ramp counter, but maintain one power ramp step for each CEL. Optionally, the terminal device may alternatively maintain only one power ramp step, but maintain one power ramp counter for each CEL.

It is assumed that each CEL corresponds to one power ramp step, and the terminal device maintains one power ramp counter for each CEL. For example, there are three CELs in total, which are a CEL 0, a CEL 1, and a CEL 2, corresponding power ramp counters are a power ramp counter 0, a power ramp counter 1, and a power ramp counter 2, and corresponding power ramp steps are a power ramp step 0, a power ramp step 1, and a power ramp step 2. During initialization, all power ramp counters 1 are set to 1. When the terminal device makes a first attempt, and a determined CEL is the CEL 1, a power ramp amount in this attempt is 0; or when the terminal device fails in the first attempt, and a CEL determined in the second attempt is the CEL 2, a power ramp amount in this attempt is 0. If the terminal device fails in the second attempt, and a CEL determined in the third attempt is the CEL 1, the count value of the power ramp counter 1 is increased by 1, and is equal to 2. The power ramp amount of the transmit power in the current attempt relative to initial transmit power=(the count value of the power ramp counter 1−1)×the power ramp step 1=(2−1)×the power ramp step 1=the power ramp step 1, and the power ramp amount of the transmit power in the current attempt relative to the initial transmit power is equal to the power ramp step 1. If the terminal device fails in the third attempt, and a CEL determined in the fourth attempt is the CEL 0, a power ramp amount in the current attempt is 0. If the terminal device fails in the fourth attempt, and a CEL determined in the fifth attempt is the CEL 1, the power ramp counter 1 is increased by 1, and is equal to 3. A power ramp amount of the transmit power in the current attempt relative to the initial transmit power=(the count value of the power ramp counter 1−1)×the power ramp step 1=(3−1)×the power ramp step 1=2×the power ramp step 1.

In a possible embodiment, the terminal device may determine the CEL in an initialization phase. For example, the terminal device determines the CEL by using RSRP of a downlink path loss reference signal. The RSRP of the downlink path loss reference signal is RSRP of layer 3, that is, RSRP that passes through a layer 3 filter is usually an average value of measured RSRP of a plurality of reference signals.

After the terminal device determines the CEL in the initialization phase, regardless of which SSB is selected in a resource selection phase of each attempt process, the terminal device performs a random access attempt or a grant-free transmission attempt by using a parameter corresponding to the CEL. For example, the terminal device performs a random access attempt or a grant-free transmission attempt by using a resource and a repetition number that correspond to the CEL.

Optionally, each CEL has a corresponding maximum attempt quantity, and the terminal device maintains an attempt quantity counter for each CEL. When the power ramp counter of the current CEL reaches the maximum attempt quantity of the CEL plus 1, the terminal device resets the attempt quantity counter, and determines that the CEL of the terminal device is a next CEL of the current CEL, that is, determines that the CEL of the terminal device is the current CEL plus 1.

Figure 9:
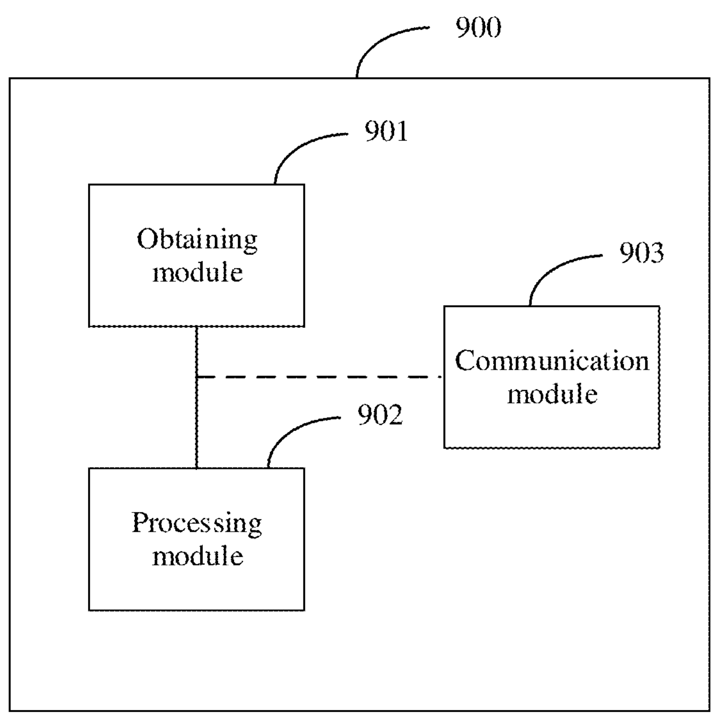
FIG. 9 is a first schematic diagram of a structure of an apparatus according to an embodiment of this application.

As shown in FIG. 9, based on a same technical concept, an embodiment of this application further provides an apparatus 900. The apparatus 900 may be a terminal device, an apparatus in the terminal device, or an apparatus that can be used together with the terminal device. In a design, the apparatus 900 may include modules that are in a one-to-one correspondence with the methods/operations/steps/actions performed by the terminal device in the foregoing method embodiments. The modules may be implemented by a hardware circuit, software, or a combination of a hardware circuit and software. In a design, the apparatus may include an obtaining module 901 and a processing module 902.

In an embodiment, the obtaining module 901 is configured to obtain one or more measurement results respectively corresponding to one or more reference signals; and the processing module 902 is configured to determine a coverage enhancement level CEL of the terminal device based on the one or more measurement results and at least one of N thresholds.

N is a positive integer, and the N thresholds are a threshold 0, a threshold 1, . . . , and a threshold (N−1) in descending order; and if there is a measurement result greater than or equal to the threshold 0 in the one or more measurement results, the CEL of the terminal device is a CEL 0; or if the one or more measurement results are all less than a threshold i, and there is a measurement result greater than or equal to a threshold (i+1) in the one or more measurement results, the CEL of the terminal device is a CEL (i+1), and a value of i is an integer from 0 to (N−2), for example, an integer from 0 to (N−2) is sequentially taken as the value of i.

Optionally, the processing module 902 is further configured to select a reference signal corresponding to a measurement result that is greater than or equal to a minimum threshold corresponding to the CEL of the terminal device.

In another embodiment, the obtaining module 901 is configured to obtain one or more measurement results respectively corresponding to one or more reference signals; and the processing module 902 is configured to: select a first reference signal from the one or more reference signals, where a measurement result of the first reference signal is greater than or equal to a reference signal received power threshold; and determine a CEL of the terminal device based on the measurement result of the first reference signal and a coverage enhancement level CEL threshold.

The processing module 902 is further configured to: select a second reference signal in a process of a $K^{th}$ random access attempt or a $K^{th}$ grant-free transmission attempt, and update the CEL of the terminal device based on a measurement result of the second reference signal and the CEL threshold, where K is a positive integer.

Optionally, the processing module 902 is further configured to: if the one or more measurement results are all less than the reference signal received power threshold, select a third reference signal less than the reference signal received power threshold, and determine the CEL of the terminal device based on a measurement result of the third reference signal and the CEL threshold.

Based on the embodiments of the two apparatuses 900 described above, optionally, the processing module 902 is further configured to: update the CEL of the terminal device in a process of the $K^{th}$ random access attempt or the $K^{th}$ grant-free transmission attempt, where K is a positive integer; and determine a power ramp amount based on a power ramp step corresponding to the updated CEL and/or a power ramp counter corresponding to the updated CEL, where the determined power ramp amount is used for the $K^{th}$ random access attempt or the $K^{th}$ grant-free transmission attempt. Optionally, the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) are corresponding to a same power ramp step, and/or the CEL 0 to the CEL (N−1) are corresponding to a same power ramp counter.

The apparatus 900 further includes a communication module 903. The communication module 903 is configured to communicate with a network device based on a parameter corresponding to the CEL of the terminal device.

The CEL of the terminal device corresponds to any one or more of the following parameters of a physical channel: a time domain resource, a frequency domain resource, a code domain resource, or a repetition number. The physical channel includes any one or more of the following parameters: a message A or a message B in a two-step random access procedure, a message 1, a message 2, a message 3, or a message 4 in a four-step random access procedure, and a physical uplink shared channel PUSCH, a physical downlink control channel PDCCH, or a physical downlink shared channel PDSCH in a grant-free transmission process.

Certainly, the obtaining module 901 and the processing module 902 may be further configured to perform another corresponding step or operation performed by the terminal device in the foregoing method embodiments. Details are not described herein.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented by hardware, or may be implemented by a software functional module.

Figure 10:
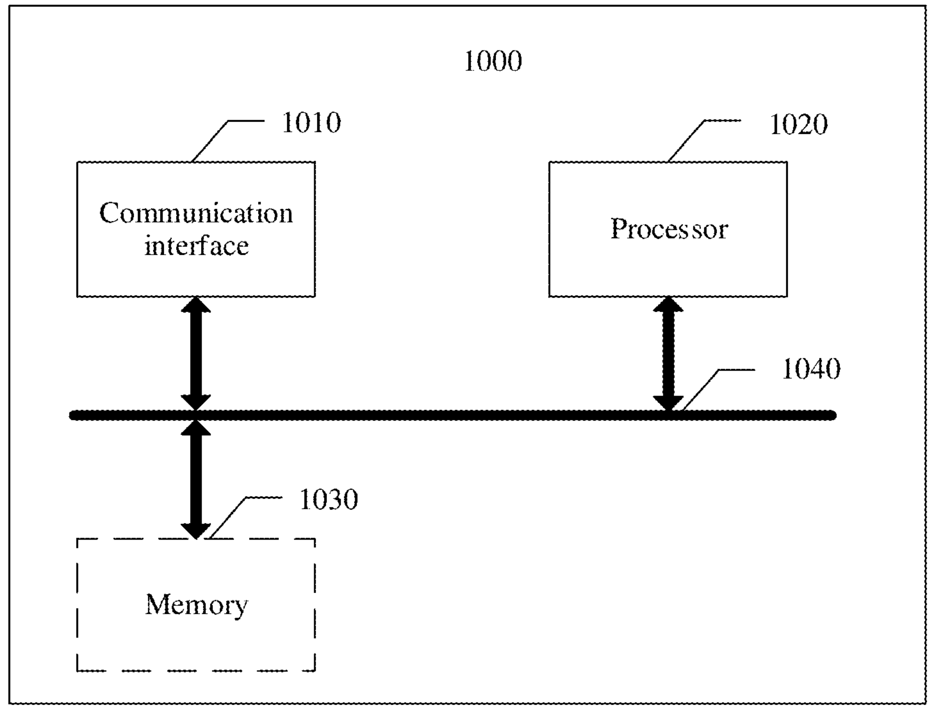
FIG. 10 is a second schematic diagram of a structure of an apparatus according to an embodiment of this application.

FIG. 10 shows an apparatus 1000 according to an embodiment of this application. The apparatus 1000 is configured to implement functions of the terminal device in the foregoing methods. The apparatus may be a terminal device, an apparatus in the terminal device, or an apparatus that can be used together with the terminal device. The apparatus may be a chip system. In this embodiment of this application, the chip system may include a chip, or may include a chip and another discrete component. The apparatus 1000 includes at least one processor 1020, configured to implement the functions of the terminal device or the network device in the methods provided in embodiments of this application. The apparatus 1000 may further include a communication interface 1010. In this embodiment of this application, the communication interface may be a transceiver, a circuit, a bus, a module, or a communication interface of another type, and is configured to communicate with another device by using a transmission medium. For example, the communication interface 1010 may be used by the apparatus 1000 to communicate with another device or another component in the device.

For example, in an embodiment, the processor 1020 is configured to: obtain one or more measurement results respectively corresponding to one or more reference signals, and determine a coverage enhancement level CEL of the terminal device based on the one or more measurement results and at least one of N thresholds.

N is a positive integer, and the N thresholds are a threshold 0, a threshold 1, . . . , and a threshold (N−1) in descending order; and if there is a measurement result greater than or equal to the threshold 0 in the one or more measurement results, the CEL of the terminal device is a CEL 0; or if the one or more measurement results are all less than a threshold i, and there is a measurement result greater than or equal to a threshold (i+1), the CEL of the terminal device is CEL (i+1), and a value of i is an integer from 0 to (N−2), for example, an integer from 0 to (N−2) is sequentially taken as the value of i.

In another embodiment, the processor 1020 is configured to obtain one or more measurement results respectively corresponding to one or more reference signals, and select a first reference signal from the one or more reference signals, where a measurement result of the first reference signal is greater than or equal to a reference signal received power threshold; and determine the CEL of the terminal device based on the measurement result of the first reference signal and a coverage enhancement level CEL threshold.

The apparatus 1000 may further include at least one memory 1030, configured to store program instructions and/or data. The memory 1030 is coupled to the processor 1020. The coupling in this embodiment of this application may be an indirect coupling or a communication connection between apparatuses, units, or modules in an electrical form, a mechanical form, or another form, and is used for information exchange between the apparatuses, the units, or the modules. The processor 1020 may cooperate with the memory 1030. The processor 1020 may execute the program instructions stored in the memory 1030. At least one of the at least one memory may be included in the processor.

A specific connection medium between the communication interface 1010, the processor 1020, and the memory 1030 is not limited in this embodiment of this application. In this embodiment of this application, in FIG. 10, the memory 1030, the processor 1020, and the communication interface 1010 are connected by using a bus 1040. The bus is represented by using a bold line in FIG. 10, and a connection manner between other parts is merely used as an example for description, and does not limit this application. The bus may be classified into an address bus, a data bus, a control bus, and the like. For ease of representation, only one bold line is used to represent the bus in FIG. 10, but this does not mean that there is only one bus or only one type of bus.

When the apparatus 900 and the apparatus 1000 are specifically chips or chip systems, the communication module 903 and the communication interface 1010 may output or receive baseband signals. When the apparatus 900 and the apparatus 1000 are specifically devices, the communication module 903 and the communication interface 1010 may output or receive radio frequency signals. In embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor or any conventional processor or the like. The steps of the methods disclosed with reference to embodiments of this application may be directly performed and completed by a hardware processor, or may be performed and completed by using a combination of hardware and software modules in the processor.

In this embodiment of this application, the memory 1030 may be a non-volatile memory, such as a hard disk drive (hard disk drive, HDD) or a solid-state drive (solid-state drive, SSD), or may be a volatile memory (volatile memory), such as a random access memory (random-access memory, RAM). The memory is any other medium that can carry or store expected program code in a form of instructions or a data structure and can be accessed by a computer, but is not limited thereto. The memory in embodiments of this application may alternatively be a circuit or any other apparatus that can implement a storage function, and is configured to store the program instructions and/or the data.

Some or all of the operations and functions performed by the terminal described in the foregoing method embodiments of this application may be implemented by using a chip or an integrated circuit.

To implement functions of the apparatus in FIG. 9 or FIG. 10, an embodiment of this application further provides a chip, including a processor, configured to support the apparatus in implementing functions of the terminal in the method embodiments. In a possible design, the chip is connected to a memory or the chip includes the memory, and the memory is configured to store program instructions and data that are necessary for the communication apparatus.

An embodiment of this application provides a computer-readable storage medium. The computer-readable storage medium stores a computer program, and the computer program includes instructions used to perform the method embodiments.

An embodiment of this application provides a computer program product including instructions. When the computer program product is run on a computer, the foregoing method embodiments are performed.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can indicate the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto the computer or another programmable data processing device, so that a series of operation steps are performed on the computer or another programmable device to generate computer-implemented processing, and instructions executed on the computer or the another programmable device provide steps for implementing a function specified in one or more procedures in the flowchart and/or one or more blocks in the block diagram.

Although some preferred embodiments of this application have been described, a person skilled in the art can make changes and modifications to these embodiments once the person skilled in the art learns the basic inventive concept. Therefore, the following claims are intended to be construed as to cover the preferred embodiments and all changes and modifications falling within the scope of this application.

Clearly, a person skilled in the art can make various modifications and variations to embodiments of this application without departing from the spirit and scope of embodiments of this application. This application is intended to cover these modifications and variations in embodiments of this application provided that they fall within the scope of protection defined by the following claims and their equivalent technologies.

What is claimed is:

1. A method of determining a coverage enhancement level, comprising:

obtaining, by a terminal device, a plurality of measurement results respectively corresponding to a plurality of reference signals; and determining, by the terminal device, a coverage enhancement level (CEL) of the terminal device based on the plurality of measurement results and at least one of N thresholds, wherein N is a positive integer, and the N thresholds are a threshold 0, a threshold 1, . . . , and a threshold (N−1) in descending order; and in said determining, in response to the plurality of measurement results including a measurement result greater than or equal to the threshold 0, the CEL of the terminal device is a CEL 0;

in response to the plurality of measurement results all being less than a threshold i, and the plurality of measurement results including a measurement result greater than or equal to a threshold (i+1), the CEL of the terminal device is a CEL (i+1), where i is an integer from 0 to (N−2); and in response to the plurality of measurement results all being less than the threshold (N−1), randomly selecting, by the terminal device and from the plurality of reference signals, a reference signal corresponding to any one of the plurality of measurement results.

2. The method according to claim 1, wherein in said determining, in response to the plurality of measurement results all being less than the threshold (N−1), the CEL of the terminal device is a CEL N.

3. The method according to claim 1, wherein the method further comprises:

selecting, by the terminal device and from the plurality of reference signals, a reference signal corresponding to, among the plurality of measurement results, a measurement result that is greater than or equal to a minimum threshold corresponding to the CEL of the terminal device.

4. The method according to claim 1, wherein the method further comprises:

in a process of a $K^{th}$ random access attempt or a $K^{th}$ grant-free transmission attempt, wherein K is a positive integer, updating, by the terminal device, the CEL of the terminal device;

determining, by the terminal device, a power ramp amount based on at least one of:

a power ramp step corresponding to the updated CEL, or a power ramp counter corresponding to the updated CEL; and using, by the terminal device, the determined power ramp amount for the $K^{th}$ random access attempt or the $K^{th}$ grant-free transmission attempt.

5. The method according to claim 4, wherein the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) correspond to a same power ramp step, and the CEL 0 to the CEL (N−1) correspond to a same power ramp counter.

6. A non-transitory computer storage medium, storing computer instructions that are executable by an apparatus to cause the apparatus to perform:

obtaining a plurality of measurement results respectively corresponding to a plurality of reference signals; and determining a coverage enhancement level (CEL) based on the plurality of measurement results and at least one of N thresholds, wherein N is a positive integer, and the N thresholds are a threshold 0, a threshold 1, . . . , and a threshold (N−1) in descending order; and in said determining, in response to the plurality of measurement results including a measurement result greater than or equal to the threshold 0, the CEL is a CEL 0;

in response to the plurality of measurement results all being less than a threshold i, and the plurality of measurement results including a measurement result greater than or equal to a threshold (i+1), the CEL is a CEL (i+1), where i is an integer from 0 to (N−2); and in response to the plurality of measurement results all being less than the threshold (N−1), selecting, from the plurality of reference signals, a reference signal corresponding to the largest measurement result in the plurality of measurement results.

7. The non-transitory computer storage medium according to claim 6, wherein in said determining, in response to the plurality of measurement results all being less than the threshold (N−1), the CEL is a CEL N.

8. The non-transitory computer storage medium according to claim 6, wherein the computer instructions are executable to further cause the apparatus to perform:

selecting, from the plurality of reference signals, a reference signal corresponding to, among the plurality of measurement results, a measurement result that is greater than or equal to a minimum threshold corresponding to the CEL.

9. The non-transitory computer storage medium according to claim 6, wherein the computer instructions are executable to further cause the apparatus to perform:

in a process of a $K^{th}$ grant-free transmission attempt, wherein K is a positive integer, updating the CEL;

determining a power ramp amount based on at least one of:

a power ramp step corresponding to the updated CEL, or a power ramp counter corresponding to the updated CEL; and using the determined power ramp amount for the $K^{th}$ grant-free transmission attempt.

10. The non-transitory computer storage medium according to claim 9, wherein the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) correspond to a same power ramp step, and the CEL 0 to the CEL (N−1) correspond to a same power ramp counter.

11. An apparatus, comprising a communication interface and a processor, wherein the communication interface is configured to communicate the apparatus with another device; and the processor is configured to invoke a group of programs, instructions, or data to perform a method of:

obtaining a plurality of measurement results respectively corresponding to a plurality of reference signals; and determining a coverage enhancement level (CEL) based on the plurality of measurement results and at least one of N thresholds, wherein N is a positive integer, and the N thresholds are a threshold 0, a threshold 1, . . . , and a threshold (N−1) in descending order; and in said determining, in response to the plurality of measurement results including a measurement result greater than or equal to the threshold 0, the CEL is a CEL 0;

in response to the plurality of measurement results all being less than a threshold i, and the plurality of measurement results including a measurement result greater than or equal to a threshold (i+1), the CEL is a CEL (i+1), where i is an integer from 0 to (N−2); and in response to the plurality of measurement results including multiple measurement results greater than the threshold 0, randomly selecting, by the terminal device and from the plurality of reference signals, a reference signal corresponding to any one of the multiple measurement results greater than the threshold 0.

12. The apparatus according to claim 11, wherein in said determining, in response to the plurality of measurement results all being less than the threshold (N−1), the CEL is a CEL N.

13. The apparatus according to claim 11, wherein the method further comprises:

selecting, from the plurality of reference signals, a reference signal corresponding to, among the plurality of measurement results, a measurement result that is greater than or equal to a minimum threshold corresponding to the CEL.

14. The apparatus according to claim 11, wherein the method further comprises:

in a process of a $K^{th}$ random access attempt or a $K^{th}$ grant-free transmission attempt, wherein K is a positive integer, updating the CEL;

determining a power ramp amount based on at least one of:

a power ramp step corresponding to the updated CEL, or a power ramp counter corresponding to the updated CEL; and using the determined power ramp amount for the $K^{th}$ random access attempt or the $K^{th}$ grant-free transmission attempt.

15. The apparatus according to claim 14, wherein the CEL 0 to a CEL (N−1) are respectively in a one-to-one correspondence with N power ramp steps, and the CEL 0 to the CEL (N−1) are respectively in a one-to-one correspondence with N power ramp counters; or the CEL 0 to a CEL (N−1) correspond to a same power ramp step, and the CEL 0 to the CEL (N−1) correspond to a same power ramp counter.

16. The method according to claim 1, wherein the method further comprises:

in response to the plurality of measurement results all being less than the threshold (N−1), skipping, by the terminal device, performing random access or grant-free transmission this time.

17. The method according to claim 1, wherein the method further comprises:

in response to the plurality of measurement results including multiple measurement results greater than the threshold 0, randomly selecting, by the terminal device and from the plurality of reference signals, a reference signal corresponding to any one of the multiple measurement results greater than the threshold 0.

18. The method according to claim 1, wherein the method further comprises:

in response to the plurality of measurement results including multiple measurement results greater than the threshold 0, selecting, by the terminal device and from the plurality of reference signals, a reference signal corresponding to the largest measurement result in the multiple measurement results greater than the threshold 0.

* * * * *